US 8,751,766 B2

(12) United States Patent
Inoue et al.

(10) Patent No.: US 8,751,766 B2
(45) Date of Patent: *Jun. 10, 2014

(54) STORAGE SYSTEM HAVING VOLATILE MEMORY AND NON-VOLATILE MEMORY

(75) Inventors: Naoki Inoue, Odawara (JP); Yasuyuki Nagasoe, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/611,302

(22) Filed: Sep. 12, 2012

(65) Prior Publication Data
US 2013/0007342 A1    Jan. 3, 2013

Related U.S. Application Data

(63) Continuation of application No. 12/306,082, filed as application No. PCT/JP2008/003604 on Dec. 4, 2008, now Pat. No. 8,275,930.

(51) Int. Cl.
*G06F 12/00* (2006.01)
(52) U.S. Cl.
USPC .................. 711/165; 711/103; 711/E12.008; 711/E12.017
(58) Field of Classification Search
USPC .................. 711/165, 103, E12.008, E12.017
See application file for complete search history.

(56) References Cited

U.S. PATENT DOCUMENTS

| 6,981,093 | B2 | 12/2005 | Minowa et al. |
| 7,613,877 | B2 | 11/2009 | Shimozono et al. |
| 2004/0054851 | A1 | 3/2004 | Acton et al. |
| 2005/0117418 | A1 | 6/2005 | Jewell et al. |
| 2005/0283648 | A1 * | 12/2005 | Ashmore ......................... 714/5 |
| 2008/0104344 | A1 | 5/2008 | Shimozono et al. |
| 2008/0189484 | A1 | 8/2008 | Iida et al. |

FOREIGN PATENT DOCUMENTS

| JP | 03-038711 | 2/1991 |
| JP | 04-170625 | 6/1992 |
| JP | 2002-268955 | 9/2002 |
| JP | 2003-345528 | 12/2003 |
| JP | 2008-108026 | 5/2008 |

* cited by examiner

*Primary Examiner* — Yong Choe
(74) *Attorney, Agent, or Firm* — Antonelli, Terry, Stout & Kraus, LLP.

(57) ABSTRACT

A storage system including: a plurality of storage devices; a volatile memory which temporarily stores data; a nonvolatile memory; a battery saving power; a cache control unit which sets, according to battery charging rate of the battery, a part of the data stored in the volatile memory as save target data which are to be saved to the nonvolatile memory when power interruption occurs, and saves the part of the data, which is set as the save target data, to the nonvolatile memory by using power of the battery when power interruption occurs.

8 Claims, 28 Drawing Sheets

FIG.10

| TBL ID | NECESSITY OF SAVING | IMPORTANCE LEVEL OF SAVING | UPDATED/NOT-UPDATED | UPDATE COUNT VALUE | SAVING COMPLETION INFORMATION | TABLE SIZE | SAVING TIME INFORMATION |
|---|---|---|---|---|---|---|---|
| 1 | NECESSARY | HIGH | UPDATED | 0 | 0 | 1024 | 2008/09/04 13:26:12 |
| 2 | NECESSARY | LOW | NOT UPDATED | 15 | 0 | 4098 | 2008/09/04 13:26:12 |
| 3 | UNNECESSARY | - | - | - | - | - | - |
| .. | .. | .. | .. | .. | .. | .. | .. |

| REPRESENTATIVE SAVING TIME | 1501 |
|---|---|
| 2008/09/04 13:26:12 | |

FIG.15B

| SAVING TIME | 1601 |
|---|---|
| 2008/09/04 13:26:12 | |

FIG.16

| SLOT NUMBER | SLOT STATE | 1701 |
|---|---|---|
| 1 | DIRTY | |
| 2 | CLEAN | |
| . | . | |
| . | . | |

FIG.17

| START ADDRESS | END ADDRESS | 1710 |
|---|---|---|
| 0000 | 0100 | |
| 0200 | 0300 | |
| . | . | |
| . | . | |

STORAGE SYSTEM HAVING VOLATILE MEMORY AND NON-VOLATILE MEMORY

CROSS REFERENCE TO RELATED APPLICATION

This is a continuation of U.S. application Ser. No. 12/306,082, filed Dec. 22, 2008 now U.S. Pat. No. 8,275,930, which application is a National Stage Entry of PCT/JP2008/003604 filed Dec. 4, 2008. The entirety of the contents and subject matter of all of the above is incorporated herein by reference.

TECHNICAL FIELD

The present invention generally relates to control of a storage system having a volatile memory and a non-volatile memory.

BACKGROUND ART

As such a storage system, a storage system disclosed in Patent Citation 1 is known, for example. According to the Patent Citation 1, in the storage system, when power supply from a primary power source to a volatile cache memory is stopped, a battery supplies power to the volatile cache memory and, meanwhile, data stored in the volatile cache memory is copied to a non-volatile memory.

PATENT CITATION 1

Japanese Patent Application Laid-Open Publication No. 2008-108026

DISCLOSURE OF INVENTION

Technical Problem

When power supply from the primary power source to the volatile memory is stopped (in other words, when an interruption of power occurs), the battery starts to supply power. When power supply from the primary power source is restarted, the battery stops supplying power and is charged again. However, when an interruption of power occurs again in the primary power source, the battery starts to supply power even before the battery is fully charged (even before the charging rate reaches 100%). In other words, if an interruption of power frequently occurs in the primary power source, information save processing from the volatile memory to the non-volatile memory is performed with power supplied from the battery not sufficiently charged. Accordingly, the remaining amount of the battery may be exhausted before saving a save target stored in the volatile memory.

If the non-volatile memory is made to have a large capacity, it can be expected that a large amount of information is saved. In that case, however, the amount of information saved from the volatile memory to the non-volatile memory becomes large, thereby requiring a long time for the save processing.

Therefore, a first object of the present invention is to allow a save target stored in the volatile memory to be reliably saved to the non-volatile memory.

A second object of the present invention is to reduce the time required for the save processing as much as possible.

Technical Solution

According to a first aspect, the charging state of a battery is regularly of irregularly checked, and, according to the checked charging state, control is achieved such that which information element stored in a volatile memory is saved in case of a power interruption. Specifically, the total amount of dirty data, to be described later, stored in the volatile memory is controlled, for example.

According to a second aspect, among a plurality of information elements stored in the volatile memory, a particular information element is made a non-save target of save processing depending on the state related to the particular information element. Specifically, for example, when the frequency of update is low, the particular information element is saved. Since the particular information element is already saved, if the particular information element is not updated anew, the particular information element is not saved when save processing is performed. Further, when the level of importance is low, the particular information element is not saved.

BRIEF DESCRIPTION OF DRAWINGS

FIG. 10 shows a structure of table management information.

FIG. 15A shows representative saving-time information.
FIG. 15B shows host data saving-time information.

FIG. 16 shows host data management information.

FIG. 17 shows address management information.

EXPLANATION OF REFERENCE

103 Storage System

BEST MODE FOR CARRYING OUT THE INVENTION

Hereinafter, an embodiment of the present invention will be described with reference to the drawings.

Figure 1:
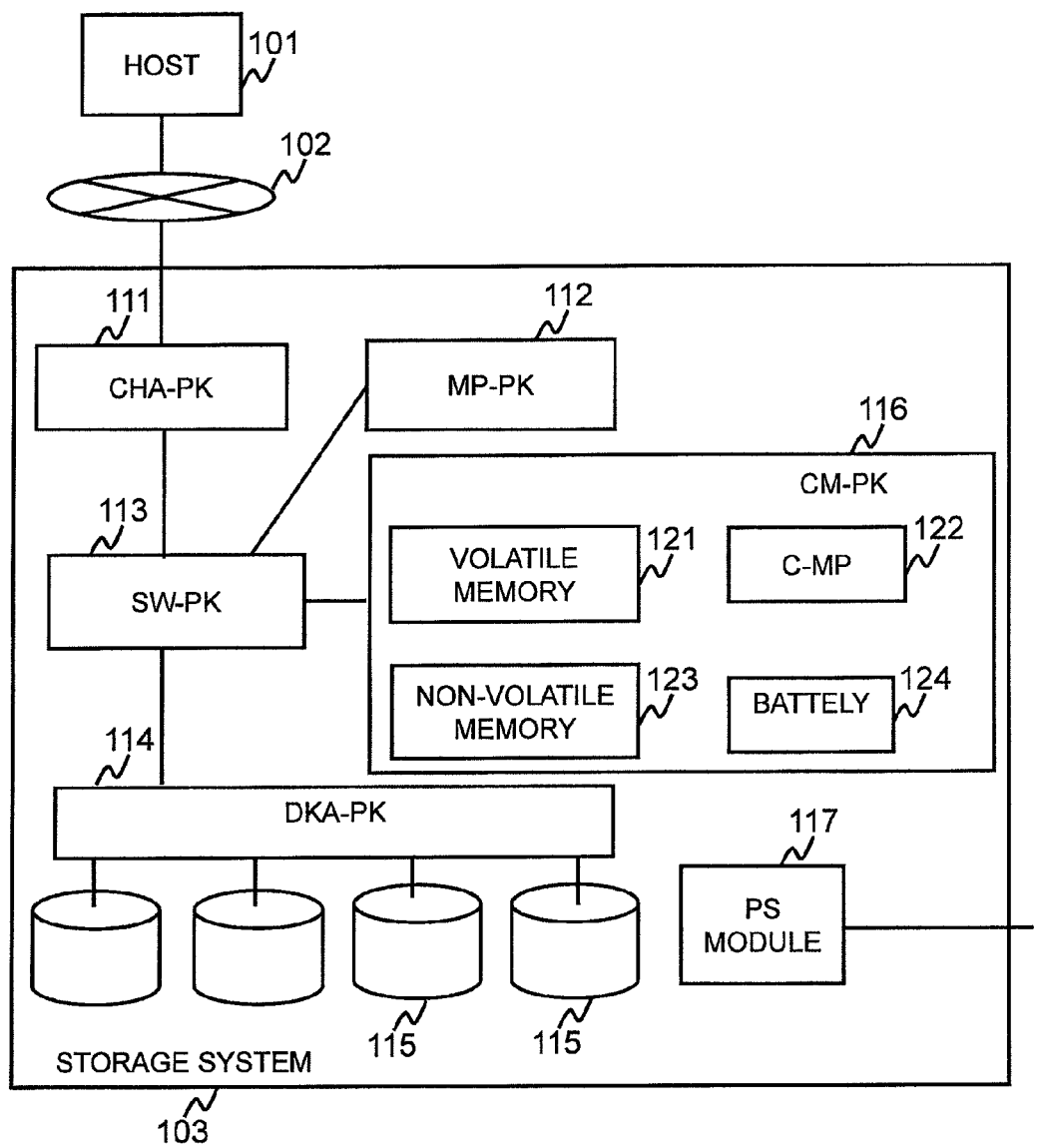
FIG. 1 shows an example configuration of a computer system according to an embodiment of the present invention.

FIG. 1 shows an example configuration of a computer system according to the embodiment of the present invention.

A storage system 103 is connected to one host 101 or more via a storage area network (SAN) 102. Instead of the SAN 102, another type of a communication network such as a local area network (LAN) may be employed.

The host 101 is a computer including information processing resources such as a central processing Unit (CPU) and a memory. For example, the host 101 is a personal computer, a workstation, or a main frame.

The storage system 103 includes a controller, a storage device group, and a power source module 117.

With power supplied from a commercial power source, the power source module 117 supplies power to each component.

The storage device group includes a plurality of hard disk drives (HDDs) 115, for example. The two or more HDDs 115 constituting a redundant array of independent (or inexpensive) disks (RAID) group form one or more logical volumes. Instead of the HDDs 115, another type of physical storage devices such as flash memories may be employed.

The controller includes multiple types of packages (hereinafter, a package is abbreviated as "PK"), specifically, a CHA-PK 111, an MP-PK 112, an SW-PK 113, a CM-PK 116, and a DKA-PK 114. The packages are circuit boards, for example. The number of packages of each type is not limited to one, but may be two or more. For example, each of the number of CHA-PKs 111 and the number of DKA-PKs 114 is two or more.

The CHA-PK 111 is an interface device which controls communication with the host 101. The CHA-PK 111 receives an I/O command (for example, a write command or a read command) from the host 101 and performs data exchange with the host 101.

The MP-PK 112 controls operations of the storage system 103.

The SW-PK 113 is connected to the CHA-PK 111, the MP-PK 112, the CM-PK 116, and the DKA-PK 114, and relays communications among these PKs.

The CM-PK 116 is a package serving as a cache memory which temporarily stores write-target data to be written to the corresponding HDD 115 in response to a write command received from the host 101 and read-target data read from the corresponding HDD 115 in response to a read command received from the host 101. The CM-PK 116 includes a volatile memory 121, a non-volatile memory 123, a battery 124, and a C-MP 122. The volatile memory 121 is used as a cache memory. The non-volatile memory 123 is used as the save destination of information stored in the volatile memory 121. For example, the non-volatile memory 123 is a device having a flash memory, such as a solid state device (SSD). The C-MP 122 is a microprocessor provided in the CM-PK 116. Although the MP-PK 112 is also provided with a microprocessor as described later, the microprocessor provided in the C-MP 122 may have a lower performance than the microprocessor provided in the MP-PK 112. In this embodiment, the microprocessor provided in the CM-PK 116 is referred to as "C-MP" and the microprocessor provided in the MP-PK 112 is referred to as "M-MP".

The DKA-PK 114 is an interface device which controls communications with the HDDs 115.

Figure 2:
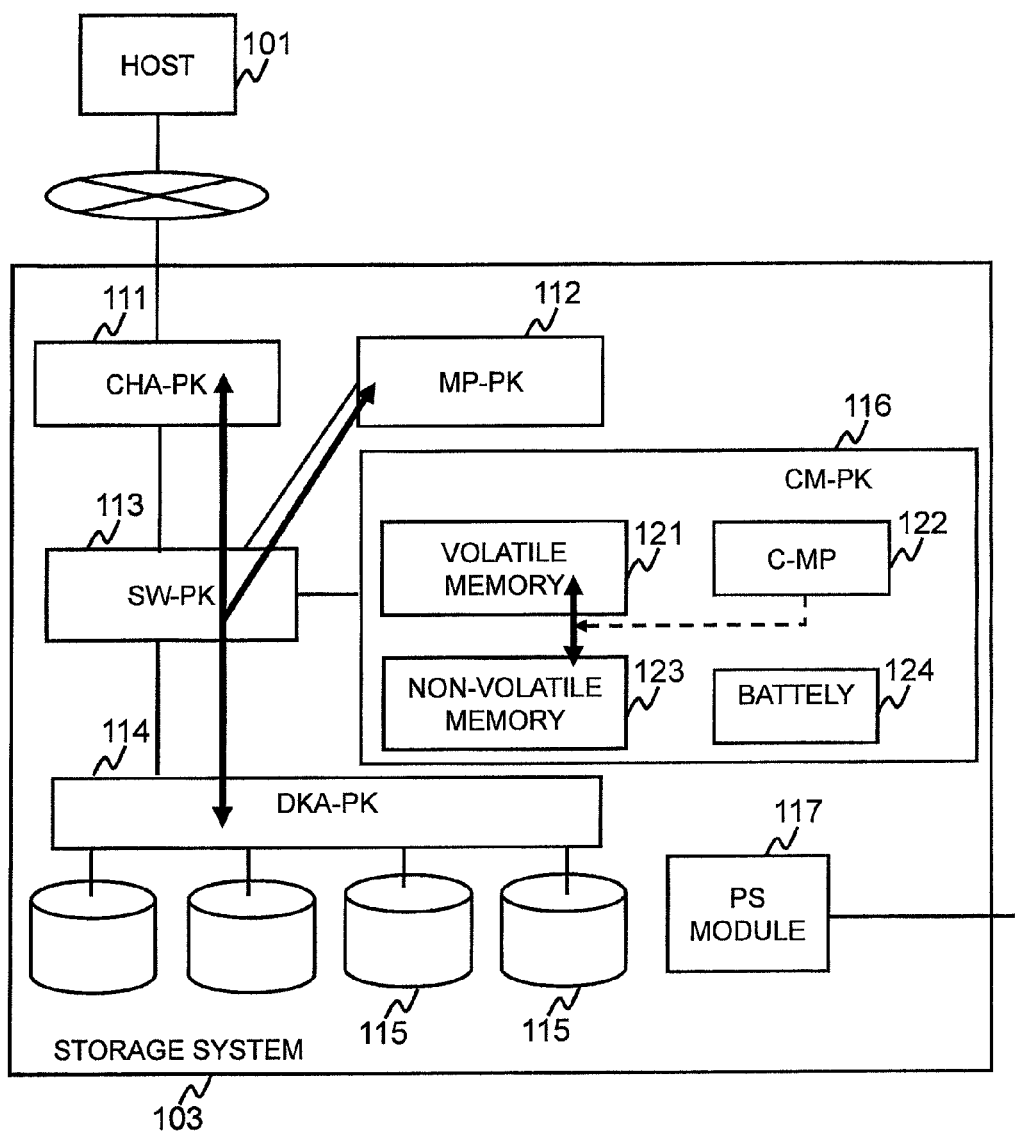
FIG. 2 shows example flows of data and a control signal in a storage system 103.

FIG. 2 shows example flows of data and a control signal in the storage system 103.

An I/O command sent from the host 101 is received by the CHA-PK 111. Data is exchanged among the CHA-PK 111, the MP-PK 112, and the DKA-PK 114 via the SW-PK 113. Further, data is exchanged between the volatile memory 121 and the non-volatile memory 123. Saving data from the volatile memory 121 to the non-volatile memory 123 and recovering data from the non-volatile memory 123 to the volatile memory 121 are performed based on control signals sent from the C-MP 122.

Figure 3:
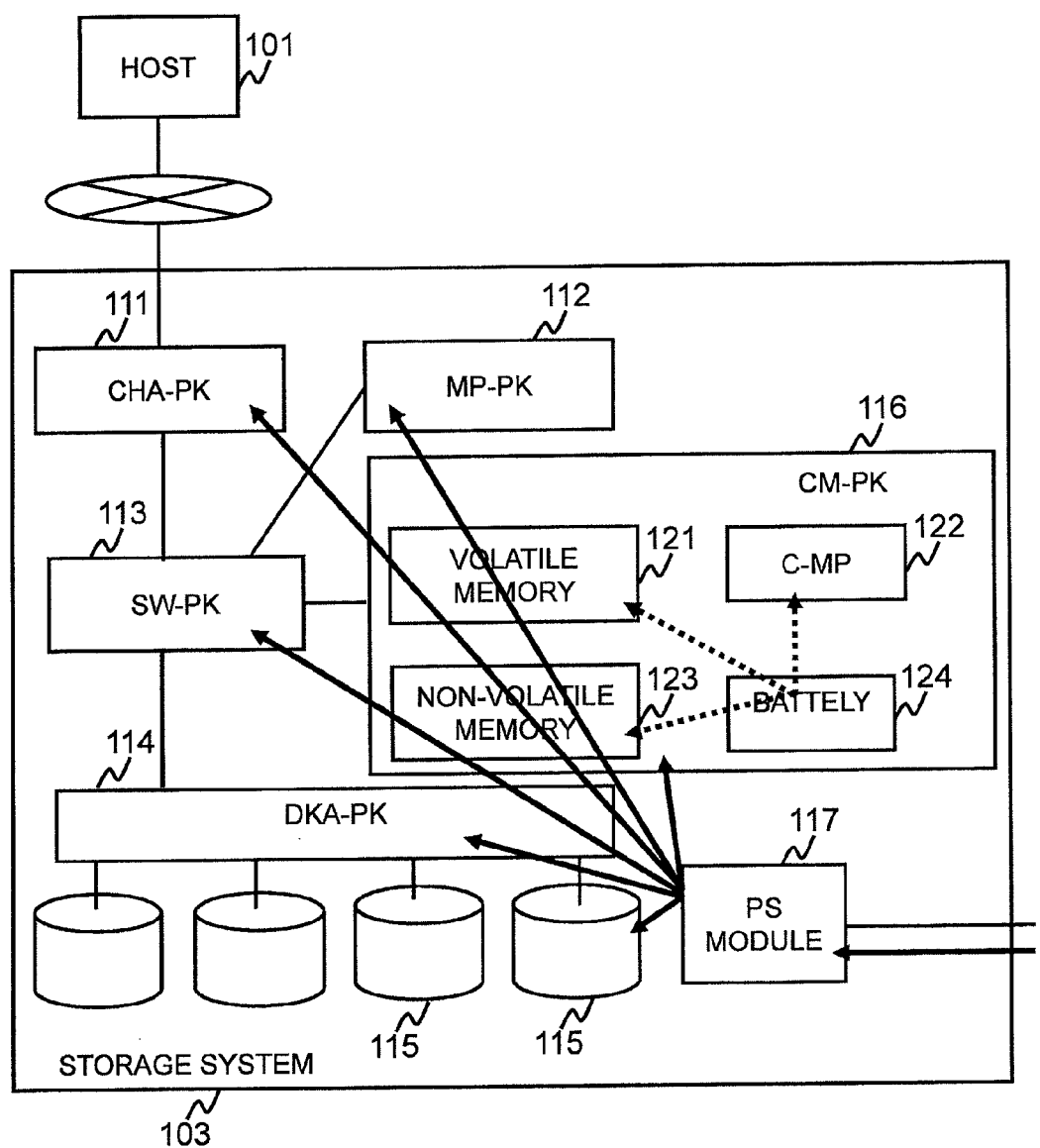
FIG. 3 shows how a power source module 117 and a battery 124 supply power.

FIG. 3 shows how the power source module 117 and the battery 124 supply power.

As indicated by solid arrows, with power from a commercial power source, the power source module 117 supplies power to the components included in the storage system 103, specifically, to the CHA-PK 111, the MP-PK 112, the SW-PK 113, the DKA-PK 114, the HDDs 115, and the CM-PK 116 (specifically, the components 121, 122, 123, and 124 included in the CM-PK 116, for example). The battery 124 is charged by power supplied from the power source module 117.

When power supply from the power source module 117 is stopped (that is, an interruption of power occurs) due to a power outage, the occurrence of a failure, or the like, the battery 124 supplies power to the other components 121, 122, and 123 included in the CM-PK 116 as indicated by dotted arrows.

Figure 4:
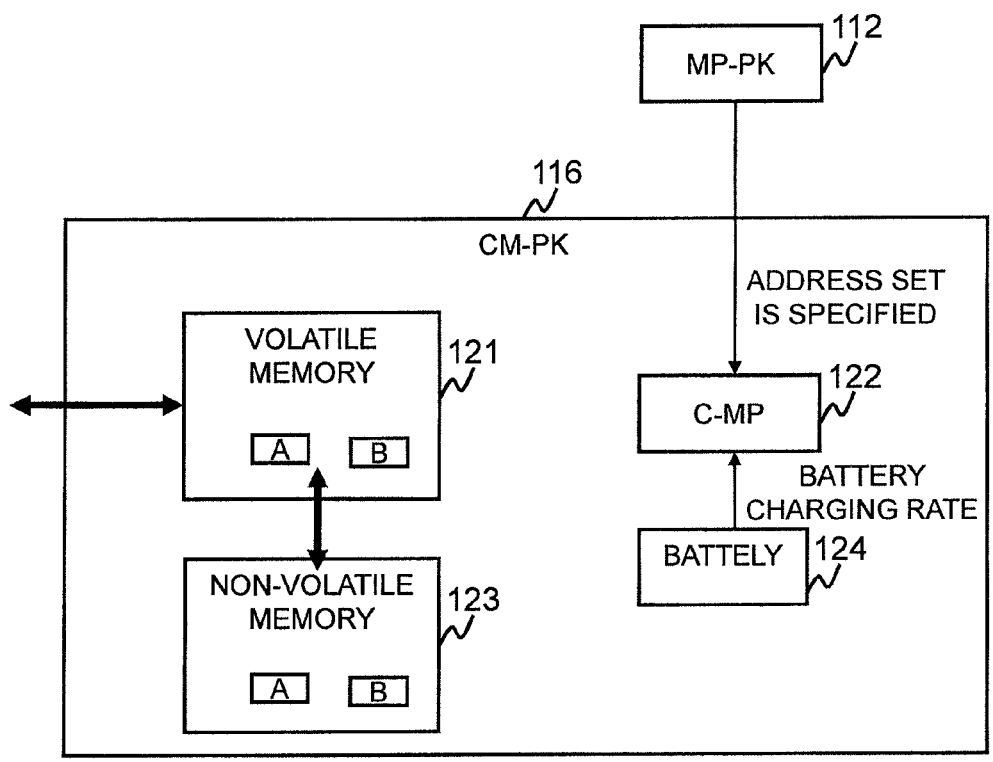
FIG. 4 is an explanatory diagram of processing performed in a CM-PK 116.

FIG. 4 is an explanatory diagram of processing performed in the CM-PK 116.

Examples of information elements stored in the volatile memory 121 include host data and a control information element. The host data is data written to the corresponding HDD 115 in response to a write command received from the host 101 and is data read from the corresponding HDD 115 in response to a read command received from the host 101. The control information element is referred to by the M-MP, to be described later, and used to control the storage system 103.

The host data (to be precise, dirty data to be described later) and the control information element stored in the volatile memory 121 are saved to the non-volatile memory 123.

The C-MP 122 has the following functions (4-1) and (4-2).

(4-1) Function of saving an information element stored in an area indicated by a specified address set (an area corresponding to the range from a start address to an end address), from the volatile memory 121 to the non-volatile memory 123.

(4-2) Function of recovering the information element from the non-volatile memory 123 to the volatile memory 121.

All information elements stored in the non-volatile memory 123 may be recovered or an information element stored in an area indicated by a specified address set (an area corresponding to the range from a start address to an end address) may be recovered. If saving of an information element from the volatile memory 121 to the non-volatile memory 123 is failed, the C-MP 122 stores information indicating saving failure in the non-volatile memory 123.

The "address set" used in this embodiment means a set of a start address and an end address. An address set is specified in a register of the C-MP 122 (and/or in the volatile memory 121). In the register (and/or the volatile memory 121), one or more address sets can be accumulated. The address set specified in the register (and/or the volatile memory 121) is written from the C-MP 122 (and/or the volatile memory 121) to the non-volatile memory 123. Accordingly, even if an interruption of power occurs, the address set is held in the non-volatile memory 123.

In this embodiment, the addresses assigned to the volatile memory 121 and the addresses assigned to the non-volatile memory 123 correspond to each other in a one-to-one manner. Therefore, in this embodiment, for example, when the address set indicating a certain address range is specified in the save processing and in the recovery processing, information is transferred from the area in one of the memories 121 and 123 corresponding to the address range to the area in the other one of the memories 121 and 123 corresponding to the address range. However, instead of this address management method, another address management method may be used, in which, for example, if the storage capacities of a non-volatile memory and a volatile memory are different, management information for managing the correspondence between the addresses of the non-volatile memory and the addresses of the volatile memory is prepared, and save processing and recovery processing are performed based on the management information.

Figure 37:
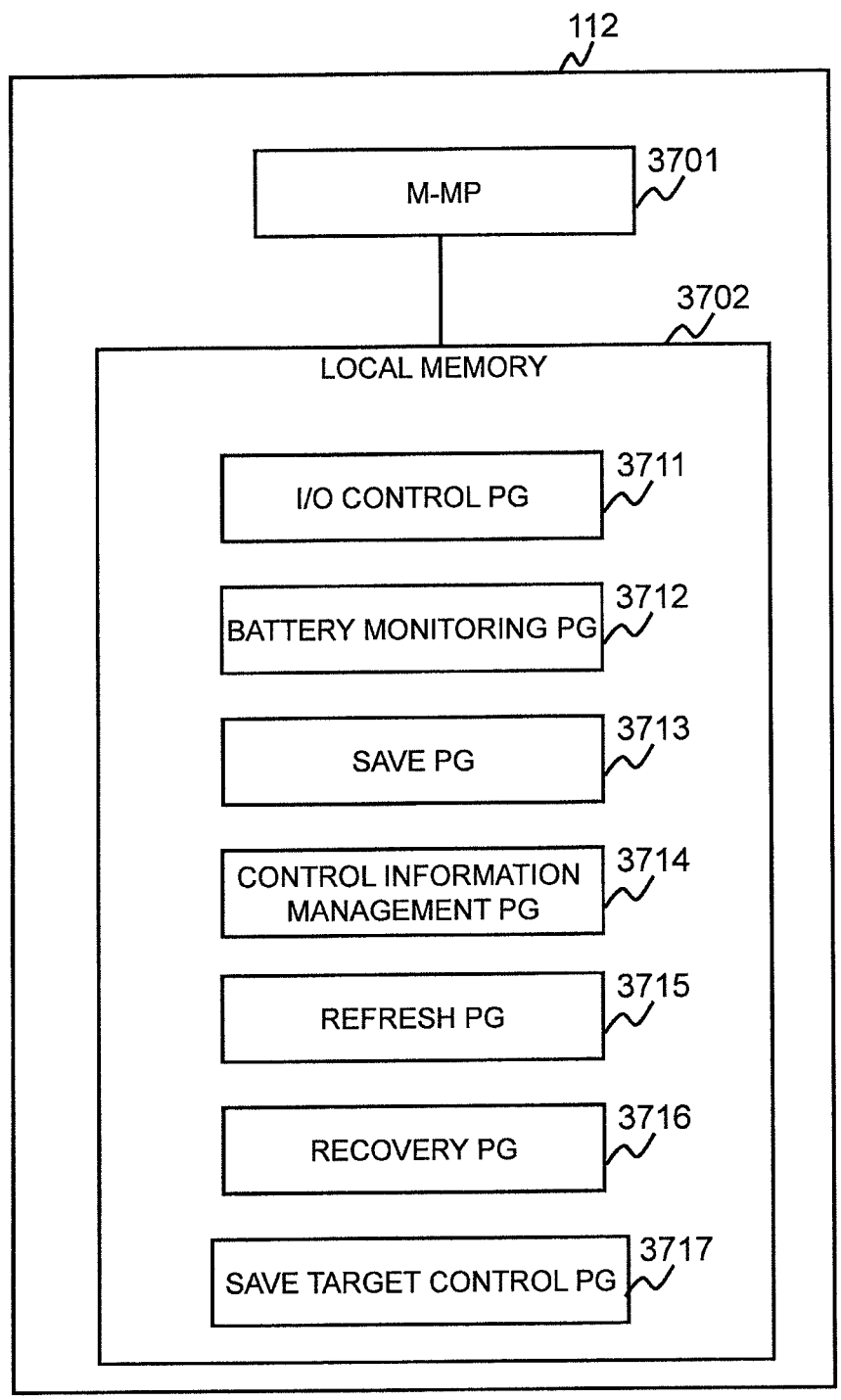
FIG. 37 shows a configuration of an MP-PK.

FIG. 37 shows an example configuration of the MP-PK 112.

The MP-PK 112 includes an M-MP 3701 and a local memory 3702, for example. The local memory 3702 stores, as computer programs (hereinafter, a computer program is abbreviated as "PG") to be executed by the M-MP 3701, an I/O control PG 3711, a battery monitoring PG 3712, a save PG 3713, a control information management PG 3714, a refresh PG 3715, a recovery PG 3716, and a save target control PG 3717, for example. Each of the PGs is described later. Note that processing may be described with a PG being used as a subject for ease of explanation, but the processing is performed by the M-MP 122, which executes the PG.

Figure 5:
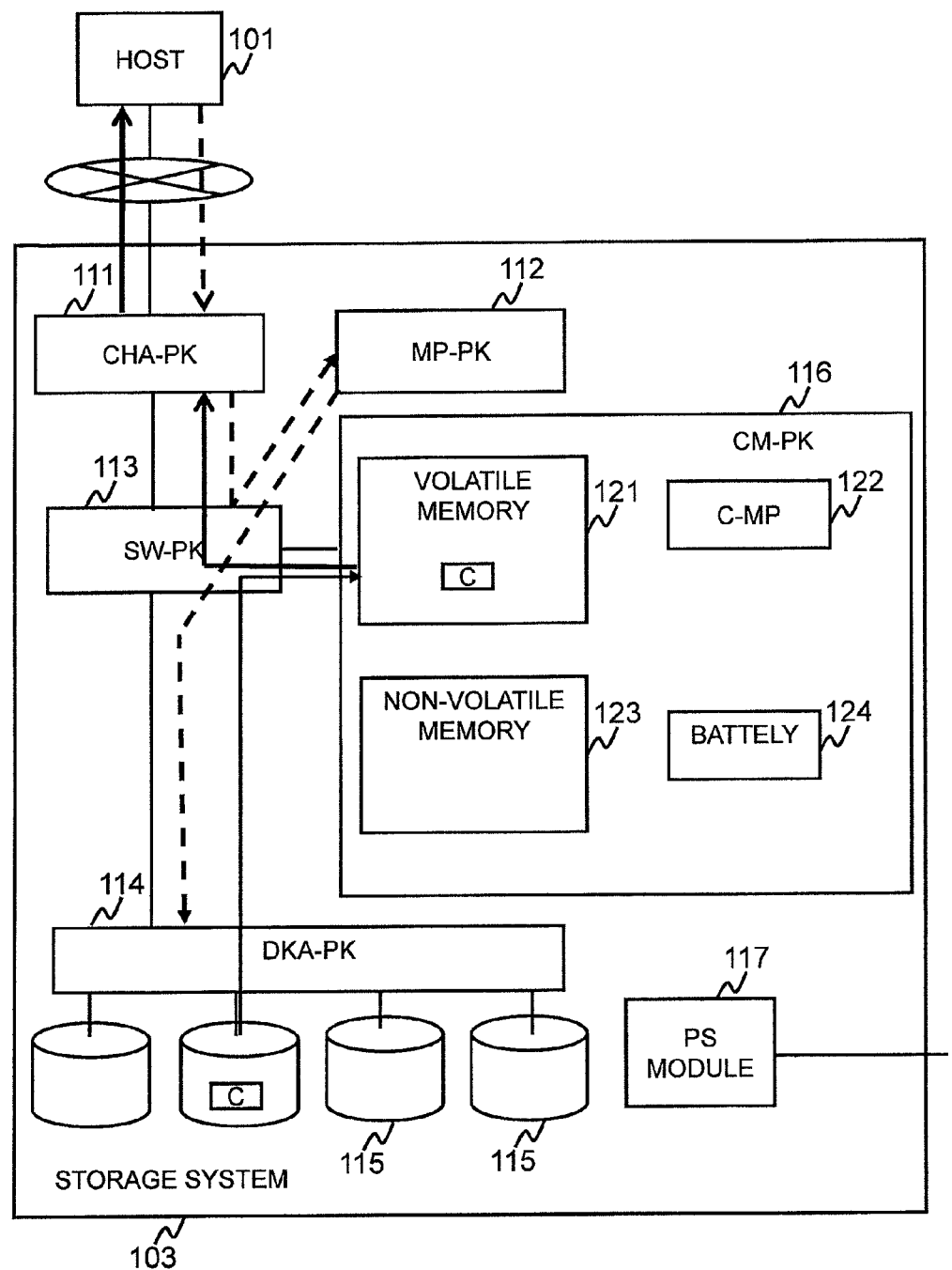
FIG. 5 shows a flow of processing performed in the storage system 103 when a read command is received from a host 101.

FIG. 5 shows a flow of processing performed in the storage system 103 when a read command is received from the host 101. Each dotted arrow indicates a flow of a command or an instruction, and each solid arrow indicates a flow of host data (the same applies to FIG. 6).

When the CHA-PK 111 receives a read command from the host 101, the read command is sent to the MP-PK 112.

When read-target host data exits in the volatile memory 121, the I/O control PG 3711 of the MP-PK 112 reads the host data from the volatile memory 121 and sends the host data to the host 101 via the CHA-PK 111.

When read-target host data does not exit in the volatile memory 121, the I/O control PG 3711 of the MP-PK 112 sends a read instruction to send read-target host data "C" to the volatile memory 121, to the DKA-PK 114, based on a read-source volume (for example, a port number and a logical unit number (LUN)), a read-source address (for example, a logical block address (LBA)), and the like specified by the received read command. In response to the read instruction, the DKA-PK 114 reads the read-target host data "C" from the HDD 115 identified by the read instruction, stores the host data "C" in the volatile memory 121, and notifies the read completion to the MP-PK 112. When the notification of the read completion is received, the I/O control PG 3711 of the MP-PK 112 reads the host data "C" from the volatile memory 121 and sends the host data "C" to the host 101 via the CHA-PK 111.

Figure 6:
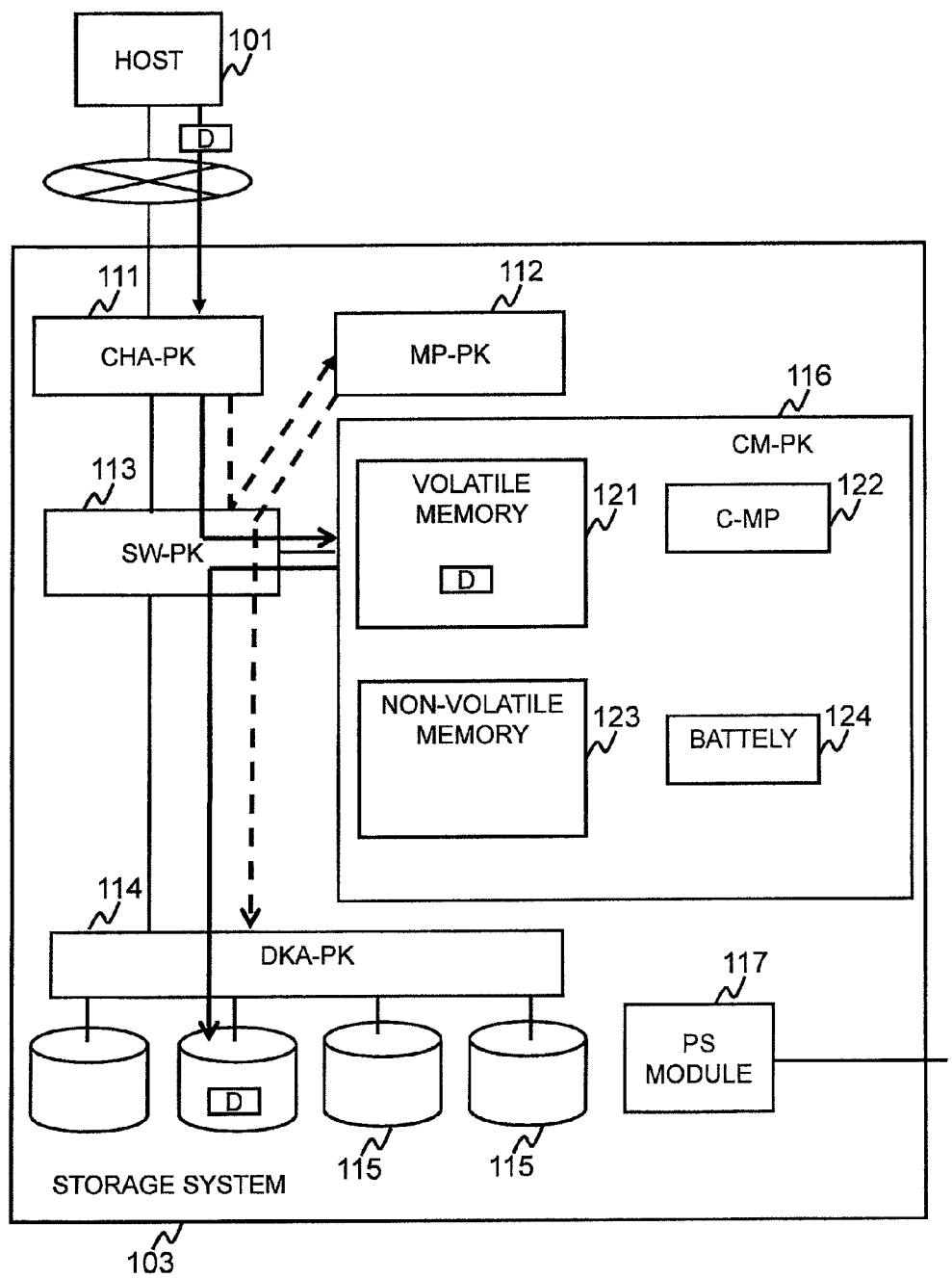
FIG. 6 shows a flow of processing performed in the storage system 103 when a write command is received from the host 101.

FIG. 6 shows a flow of processing performed in the storage system 103 when a write command is received from the host 101.

When the CHA-PK 111 receives a write command from the host 101, the write command is sent to the MP-PK 112. The I/O control PG 3711 of the MP-PK 112 writes write-target host data "D" specified by the write command to the volatile memory 121. Then, the I/O control PG 3711 of the MP-PK 112 sends a write instruction to write the host data "D" to the corresponding HDD 115, to the DKA-PK 114, based on a write-destination volume, a write-destination address, and the like specified by the received write command. In response to the write instruction, the DKA-PK 114 reads the host data "D" from the volatile memory 121 and stores the host data "D" to the corresponding HDD 115.

Figure 8:
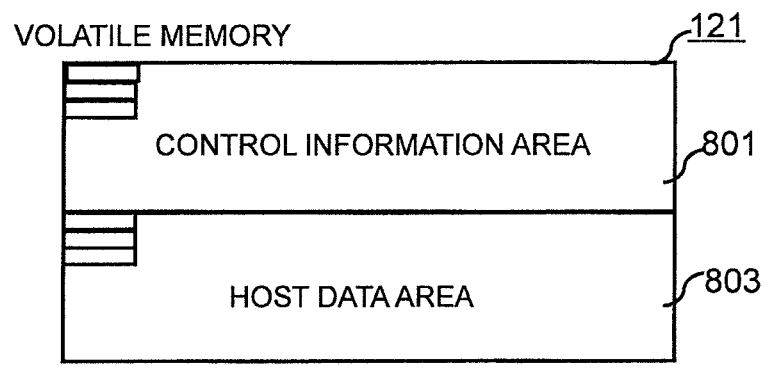
FIG. 8 shows an example configuration of a volatile memory 121.

FIG. 8 shows an example configuration of the volatile memory 121.

The volatile memory 121 includes a control information area 801 and a host data area 803. The above-mentioned control information is stored in the control information area 801, and host data is stored in the host data area 803. Examples of control information elements include the following information elements:

(1) various control tables;
(2) dirty-amount management information;
(3) control-amount management information;
(4) monitored charging-rate information;
(5) monitored dirty-amount information;
(6) representative saving-time information;
(7) host data saving-time information; and
(8) host data management information.

Hereinafter, the control information elements will be described.

Figure 9:
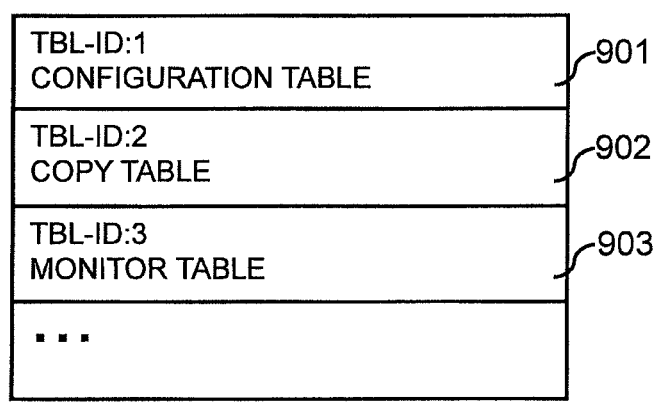
FIG. 9 shows example control tables.

FIG. 9 shows example control tables.

Control tables are information elements used when the MP-PK 112 performs control. The control tables include a configuration table 901, a copy table 902, and a monitor table 903, for example. The configuration table 901 holds information related to the configuration of the storage system 103 (for example, information indicating a logical volume assigned to each LUN and an HDD used to form each logical volume). The copy table 902 holds information related to copy performed between volumes (for example, information indicating volumes forming a pair and the state of the pair). The monitor table 903 holds information indicating various monitoring results obtained in the storage system 103. To each of the control tables, a table ID for identifying the control table is assigned.

FIG. 10 shows a structure of table management information.

Table management information 1001 is a table holding information related to the control tables. The table management information 1001 holds, for each of the control tables, sub information elements such as saving necessity information, saving importance-level information, updated-or-not information, an update count value, saving completion information, a table size, and saving time information. In a description to be given below with reference to FIG. 10, a certain control table is referred to as "target control table" and the sub information elements of the target control table will be described.

The saving necessity information is a sub information element indicating whether the target control table needs to be saved to the non-volatile memory 123. Whether the target control table needs to be saved or not is determined in advance based on the type of the target control table.

The saving importance-level information is a sub information element indicating the level of importance of the target control table. In this embodiment, the level of importance is indicated by either one of two values, that is, "high" (a value indicating that saving of the target control table is essential) and "low" (a value indicating that no problem occurs even if the target control table is not saved). The level of importance is also determined in advance based on the type of the target control table.

The updated-or-not information is a sub information element indicating whether the target control table has been updated after the storage system 103 was activated or after the target control table was saved.

The update count value is a sub information element indicating the number of times the target control table is updated.

The saving completion information is a sub information element indicating whether save processing of the target control table has been successfully completed. The saving completion information is set to a value "0" when the target control table has been saved or is set to a value "1" when the target control table has not been saved.

The table size is a sub information element indicating the size (information amount) of the target control table.

The saving time information is a sub information element indicating the time at which the target control table is saved.

Figure 11:
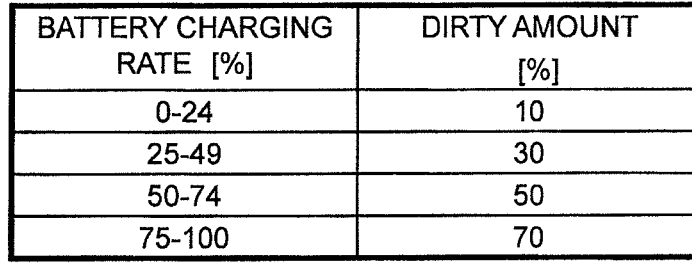
FIG. 11 shows a structure of dirty-amount management information.

FIG. 11 shows a structure of dirty-amount management information.

Dirty-amount management information 1101 is a control information element indicating the amount of dirty data which can be saved at a battery charging rate. Specifically, the dirty-amount management information 1101 holds the dirty amount which can be saved for each range of battery charging rates. The "dirty amount" means the total amount of dirty data. The dirty amount is the total amount of dirty data calculated when the storage capacity of the host data area 803 (see FIG. 8) is set to 100. The "dirty data" is host data that is stored in the volatile memory 121 but is not stored in any of the HDDs 115. On the other hand, host data that is stored in the volatile memory 121 and is also stored in any of the HDDs 115 is called "clean data".

Figure 12:
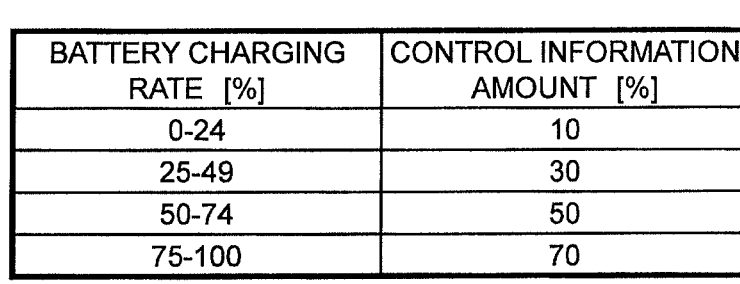
FIG. 12 shows a structure of control-amount management information.

FIG. 12 shows a structure of control-amount management information.

Control-amount management information 1201 is a control information element indicating the amount of control information which can be saved at a battery charging rate. Specifically, the control-amount management information 1201 holds the amount of control information which can be saved for each range of battery charging rates. The amount of control information is calculated when the storage capacity of the control information area 801 (see FIG. 8) is set to 100.

Figure 13:
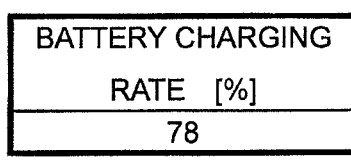
FIG. 13 shows monitored charging-rate information.

FIG. 13 shows monitored charging-rate information.

Monitored charging-rate information 1301 is a control information element indicating a monitoring result of the charging rate of the battery 124. Specifically, the charging rate of the battery 124 is regularly (or irregularly) checked, and the checked charging rate is stored in the volatile memory 121 as the monitored charging-rate information 1301. The charging rate of the battery 124 can be monitored by the battery monitoring PG 3712 and by the C-MP 122. In other words, software monitoring and hardware monitoring can be performed. A battery charging rate checked through hardware monitoring is preferentially stored as the monitored charging-rate information 1301. When hardware monitoring is not performed, a battery charging rate checked through software monitoring is stored as the monitored charging-rate information 1301.

Figure 14:
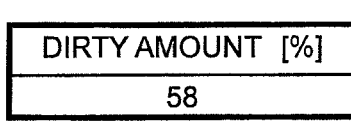
FIG. 14 shows monitored dirty-amount information.

FIG. 14 shows monitored dirty-amount information.

Monitored dirty-amount information 1401 is a control information element indicating the current dirty amount. The monitored dirty-amount information 1401 is updated by the I/O control PG 3711 or the save PG 3713 every time the total amount of dirty data is changed, for example, every time write-target data is stored in the volatile memory 121, or every time dirty data is stored in any of the HDDs 115 from the volatile memory 121.

FIG. 15A shows representative saving-time information.

Representative saving-time information 1501 is a control information element used as a basis for the saving time information of the table management information 1001 (see FIG. 10) and host data saving-time information 1601 shown in FIG. 15B. The representative saving-time information 1501 indicates the starting time of save processing for a scheduled down time, for example.

FIG. 15B shows host data saving-time information.

The host data saving-time information 1601 is a control information element indicating the time at which dirty data is saved from the volatile memory 121 to any of the HDDs 115.

FIG. 16 shows host data management information.

Host data management information 1701 is a control information element for managing the attribute of host data stored in each slot (storage area) in the host data area 803 of the volatile memory 121. The host data management information 1701 includes, for each slot, a slot number and a slot state, for example. The slot state is information indicating that host data stored in the corresponding slot is clean data or dirty data.

Note that the size of each slot is fixed. Therefore, the dirty amount can be calculated based on the size of the host data area 803 and the total size obtained from the number of slots in which dirty data is stored and the size of each slot.

FIG. 17 shows address management information.

Address management information 1710 includes one or more address sets (each set includes a start address and an end address) described above. The address management information 1710 is stored in the register of the C-MP 122 or in the volatile memory 121, and is saved to the non-volatile memory 123.

Among the above-described pieces of information, at least the table management information 1001 (see FIG. 10), the representative saving-time information 1501 (see FIG. 15A), and the host data management information 1701 (see FIG. 16) are save targets of save processing to be performed in a power interruption phase. In other words, in case of save processing to be performed in the power interruption phase, the address management information 1710 always includes the start address and the end address of the range occupied by the table management information 1001, the start address and the end address of the range occupied by the representative saving-time information 1501, the start address and the end address of the range occupied by the host data management information 1701.

Hereinafter, a description will be given of processing performed in this embodiment, in each of the following four phases: the scheduled down time phase; the power interruption phase; a recovery phase; and a normal phase.

<Scheduled Down Time Phase>

Figure 7:
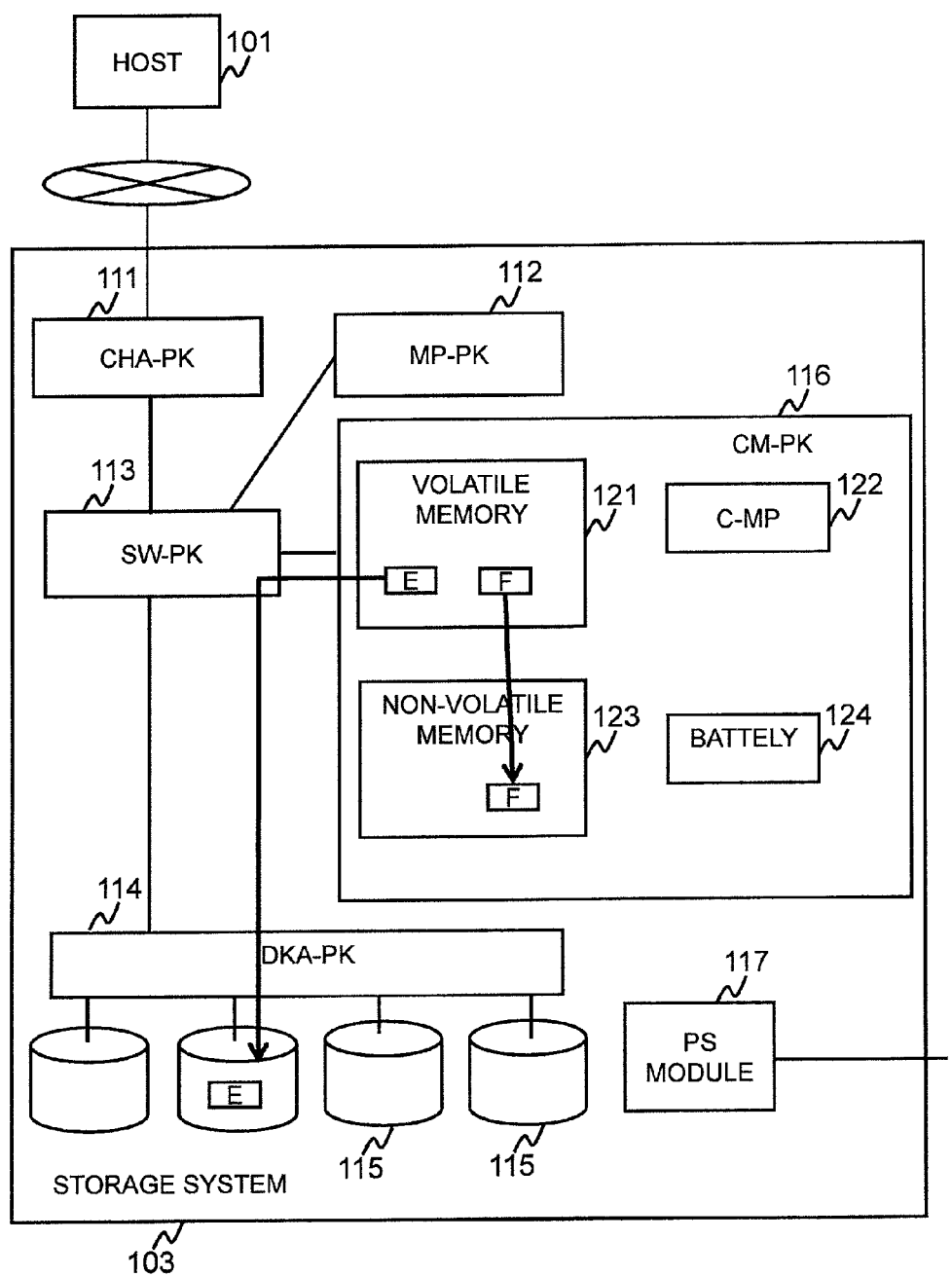
FIG. 7 shows an overview of save processing performed in a scheduled down time phase.

FIG. 7 shows an overview of save processing performed in the scheduled down time phase.

In the scheduled down time phase, the power source module 117 supplies power to the volatile memory 121, unlike in the power interruption phase. Therefore, even if the total amount of save-target control information elements is larger than that specified at the charging rate of the battery 124, all of the save-target control information elements can be saved from the volatile memory 121 to the non-volatile memory 123.

The scheduled down time phase starts when a scheduled down time signal is detected, for example. The scheduled down time signal may be input, for example, from the host 101 or an external device such as a management computer (not shown), or may be input when a particular switch provided in the storage system 103 is turned on.

In the scheduled down time phase, two kinds of save processing, dirty save processing and control save processing, are performed. In the dirty save processing, dirty data "E" is stored in the HDD 115 corresponding to the write destination specified by a write command in which the dirty data "E" is specified as a write target. In the control save processing, which control table is determined to be a non-save target among a plurality of kinds of control tables, and a control information element "F" that was not determined to be a non-save target (in other words, the control information element "F" that was determined to be a save target) is saved to the non-volatile memory 123.

The dirty save processing and the control save processing are both performed by the save PG 3713 (see FIG. 37). Hereinafter, a flow of the dirty save processing and a flow of the control save processing will be described with reference to FIG. 18 and FIG. 19, respectively.

Figure 18:
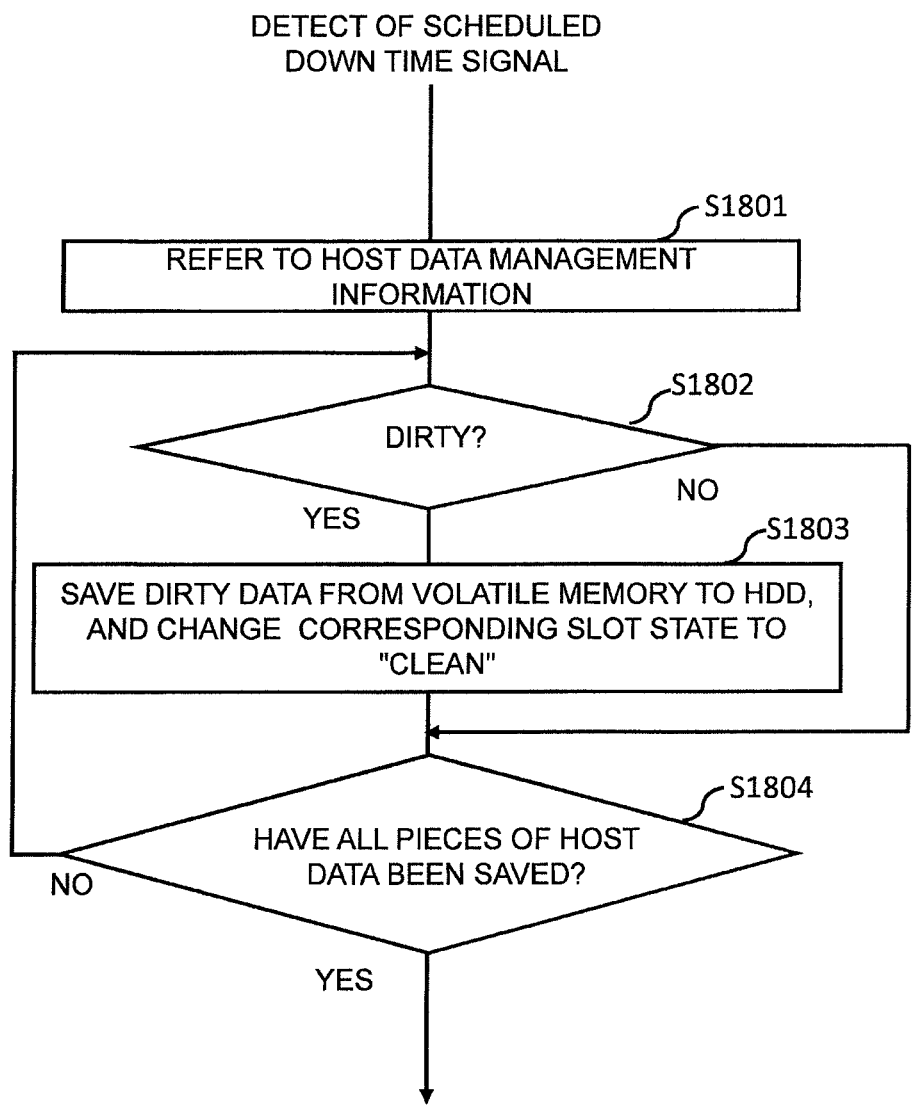
FIG. 18 shows a flow of dirty save processing.

FIG. 18 shows the flow of the dirty save processing. When a scheduled down time signal is detected, the save PG 3713 refers to the host data management information 1701 (see FIG. 16) (S1801) and performs Steps S1802 to S1804 for each of the records, from the top record to the last record, in the host data management information 1701 (in other words, for each of the slots, from the top slot to the last slot, in the host data area 803).

Specifically, when "dirty" is not recorded as the slot state in the referenced record (S1802: NO), the save PG 3713 skips Step S1803 and performs Step S1804. On the other hand, when "dirty" is recorded as the slot state in the referenced record (S1802: YES), the save PG 3713 stores dirty data stored in the slot corresponding to the record, in any of the HDDs 115, and changes the value of the slot state from "dirty" to "clean" (S1803). Then, when the referenced record is not the last record (S1804: NO), the save PG 3713 performs Step S1802 for the next record.

Figure 19:
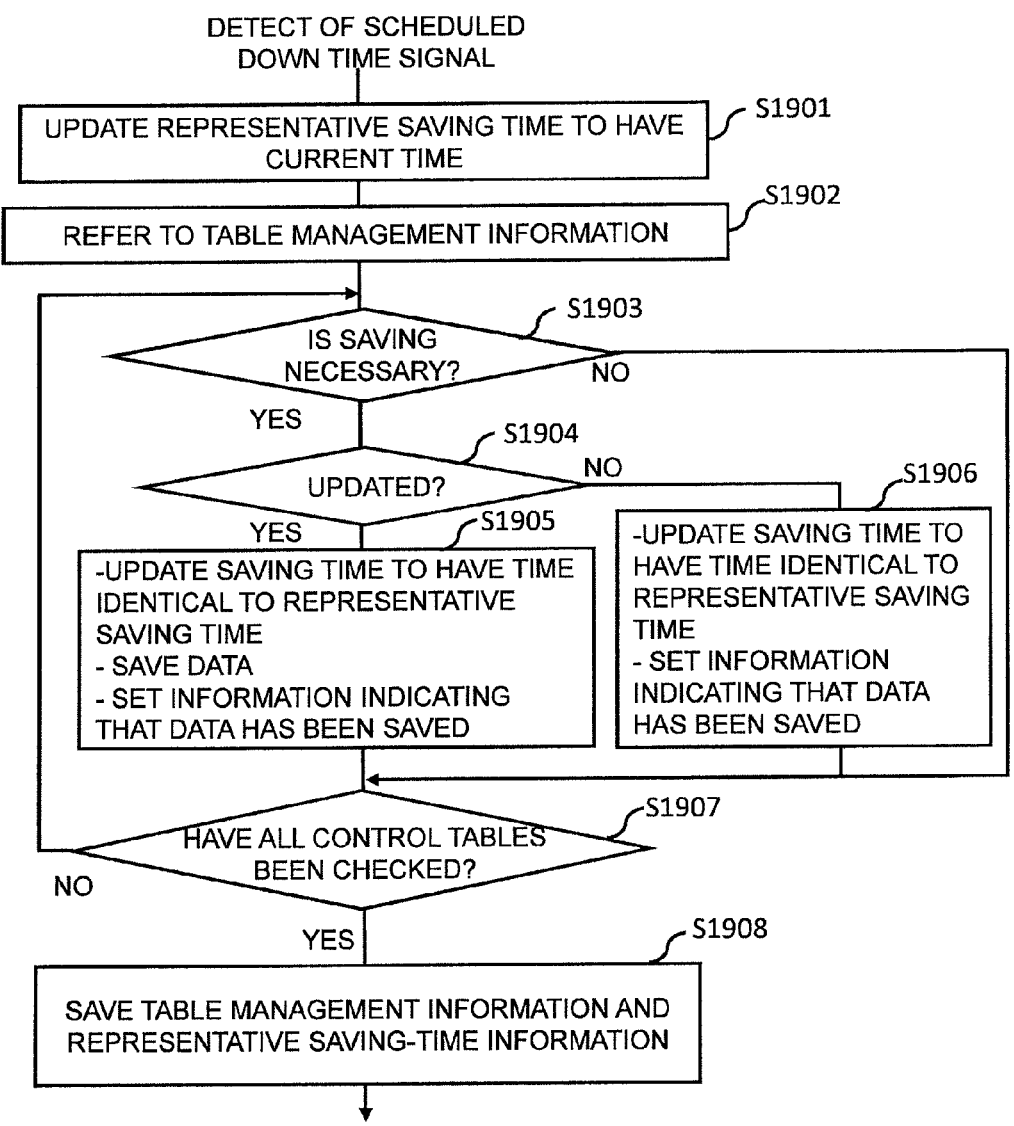
FIG. 19 shows a flow of control save processing.

FIG. 19 shows the flow of the control save processing.

When a scheduled down time signal is detected, the save PG 3713 updates the representative saving-time information 1501 to have information indicating the current time (S1901). The current time is obtained from a timer, for example.

The save PG 3713 refers to the table management information 1001 (see FIG. 10), and performs Steps S1903 to S1907 for each of the records, from the top record to the last record, in the table management information 1001.

Specifically, when "unnecessary" is recorded as the saving necessity information in the referenced record (S1903: NO), the save PG 3713 skips Steps S1904 to S1906 and performs Step S1907. When "necessary" is recorded as the saving necessity information in the referenced record (S1903: YES), the save PG 3713 judges whether "updated" or "not updated" is recorded as the updated-or-not information (S1904). When "updated" is recorded as the updated-or-not information, the save PG 3713 performs, in Step S1905, the following processes of:

(1905-1) updating the saving time information in the referenced record to have the same information as the representative saving-time information;

(1905-2) specifying, in the C-MP 122, the address set corresponding to the area where the control table corresponding to the referenced record is stored, and causing the C-MP 122 to save the control table stored in the area corresponding to the specified address set, from the volatile memory 121 to the non-volatile memory 123; and (1905-3) updating the value of the saving completion information in referenced record to have "0", which indicates that the control table has been saved.

On the other hand, when "not updated" is recorded as updated-or-not information, the save PG 3713 performs, in Step S1906, the following processes of:

(1906-1) updating the saving time information in the referenced record to have the same information as the representative saving-time information; and (1906-2) updating the value of the saving completion information in referenced record to have "0", which indicates that the control table has been saved. In short, a control table in which "not updated" is recorded as the updated-or-not information is determined to be a non-save target and is not saved to the non-volatile memory 123. After Step S1905 or S1906, when the referenced record is not the last record (S1907: NO), the save PG 3713 performs Step S1903 for the next record.

When Steps S1903 to S1905 or S1906 are performed for the last record in the table management information 1001 (S1907: YES), the save PG 3713 causes the C-MP 122 to save the table management information 1001 and the representative saving-time information 1501 to the non-volatile memory 123 (S1908).

According to the control save processing described above, a control table for which "unnecessary" is recorded as the saving necessity information and a control table which has been saved and for which "not updated" is recorded as the updated-or-not information are determined to be non-save targets. Therefore, it can be expected that the time required for the save processing in the scheduled down time phase is made shorter.

Note that, when saving of all save targets is succeeded in the scheduled down time phase, the C-MP 122 sets information indicating save success in the non-volatile memory 123.

<Power Interruption Phase>

Figure 20:
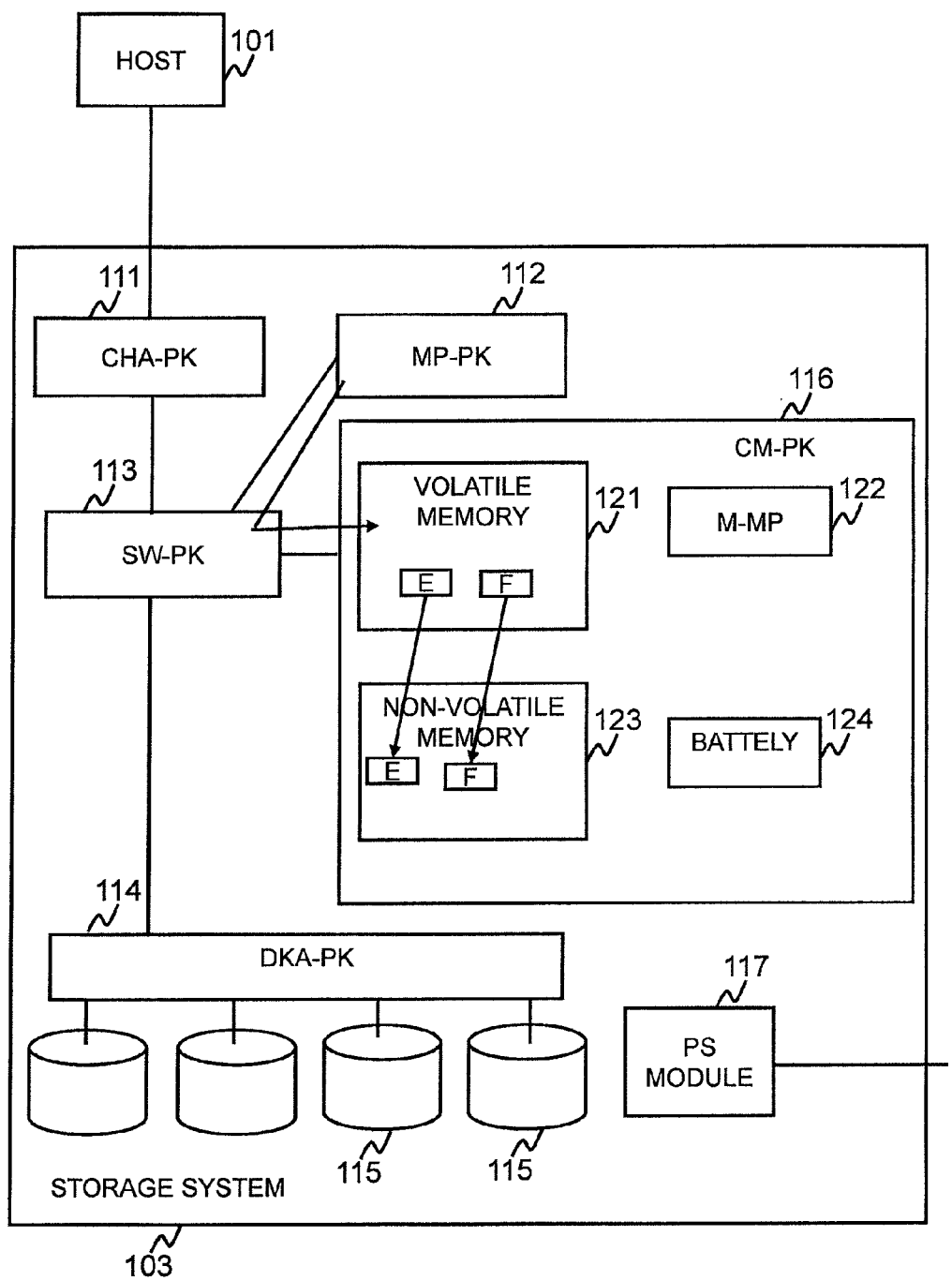
FIG. 20 shows an overview of save processing performed in a power interruption phase.

In the power interruption phase, as shown in FIG. 20, all information elements stored in the areas indicated by the address sets specified in the C-MP 122, specifically, both of the dirty data "E" and the control information element "F", are saved from the volatile memory 121 to the non-volatile memory 123.

Figure 21:
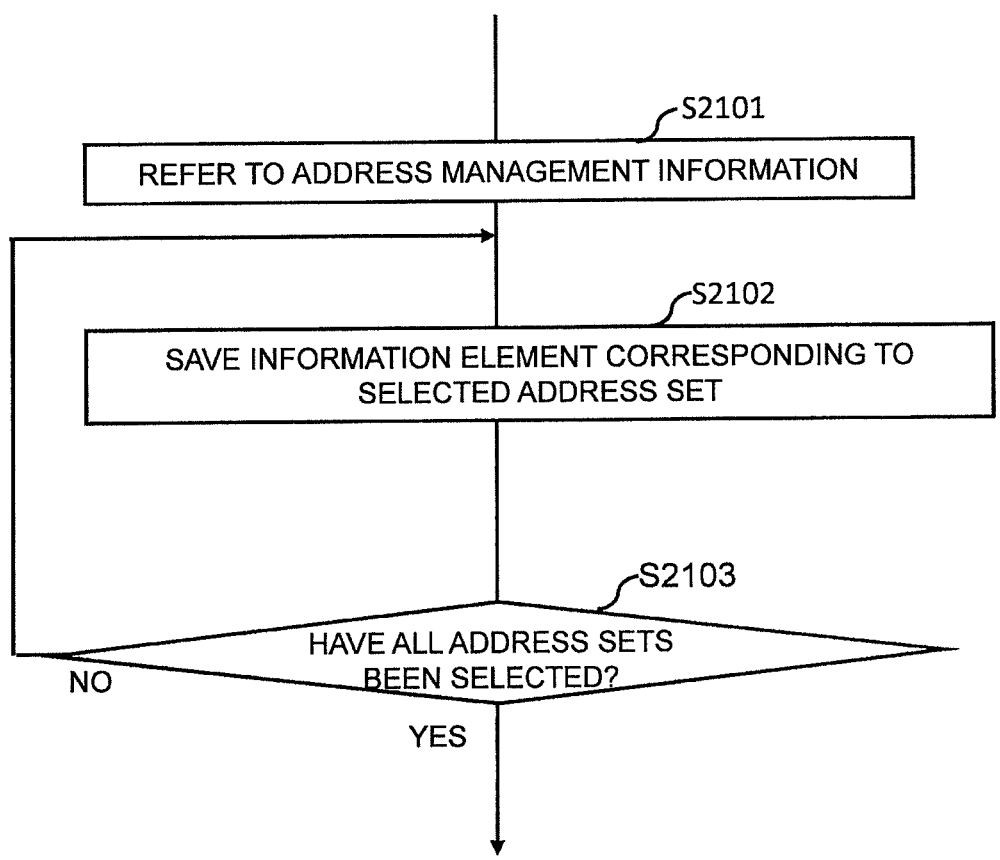
FIG. 21 shows a flow of the save processing performed in the power interruption phase.

FIG. 21 shows a flow of save processing performed in the power interruption phase.

When an interruption of power is detected, the C-MP 122 refers to the address management information 1710 (see FIG. 17) specified in the register of the C-MP 122 (S2101). The C-MP 122 selects one address set from the address management information 1710, and saves information (dirty data or a save-target information element in control information) stored in the area (the area in the volatile memory 121) identified by the selected address set, from the volatile memory 121 to the non-volatile memory 123 (S2102). When an address set that has not been selected is included in the address management information 1710 (S2103: NO), the C-MP 122 performs Step S2102 for the address set. When an address set that has not been selected is not included (S2103: YES), the C-MP 122 ends the save processing.

According to the flow described above, in the power interruption phase, an information element stored in the area corresponding to an address set included in the address management information 1710 is saved from the volatile memory 121 to the non-volatile memory 123. Which information element in the volatile memory 121 should be saved in the power interruption phase is determined in the normal phase. Specifically, in the normal phase, when a certain information element is determined to be a non-save target, the address set indicating the area where the certain information element is stored is deleted from the address management information 1710. In contrast, when a certain information element is changed from a non-save target to a save target, the address set indicating the area where the certain information element is stored is added to the address management information 1710. When saving of all save targets is succeeded, the C-MP 122 sets information indicating save success in the non-volatile memory 123.

<Recovery Phase>

Figure 22:
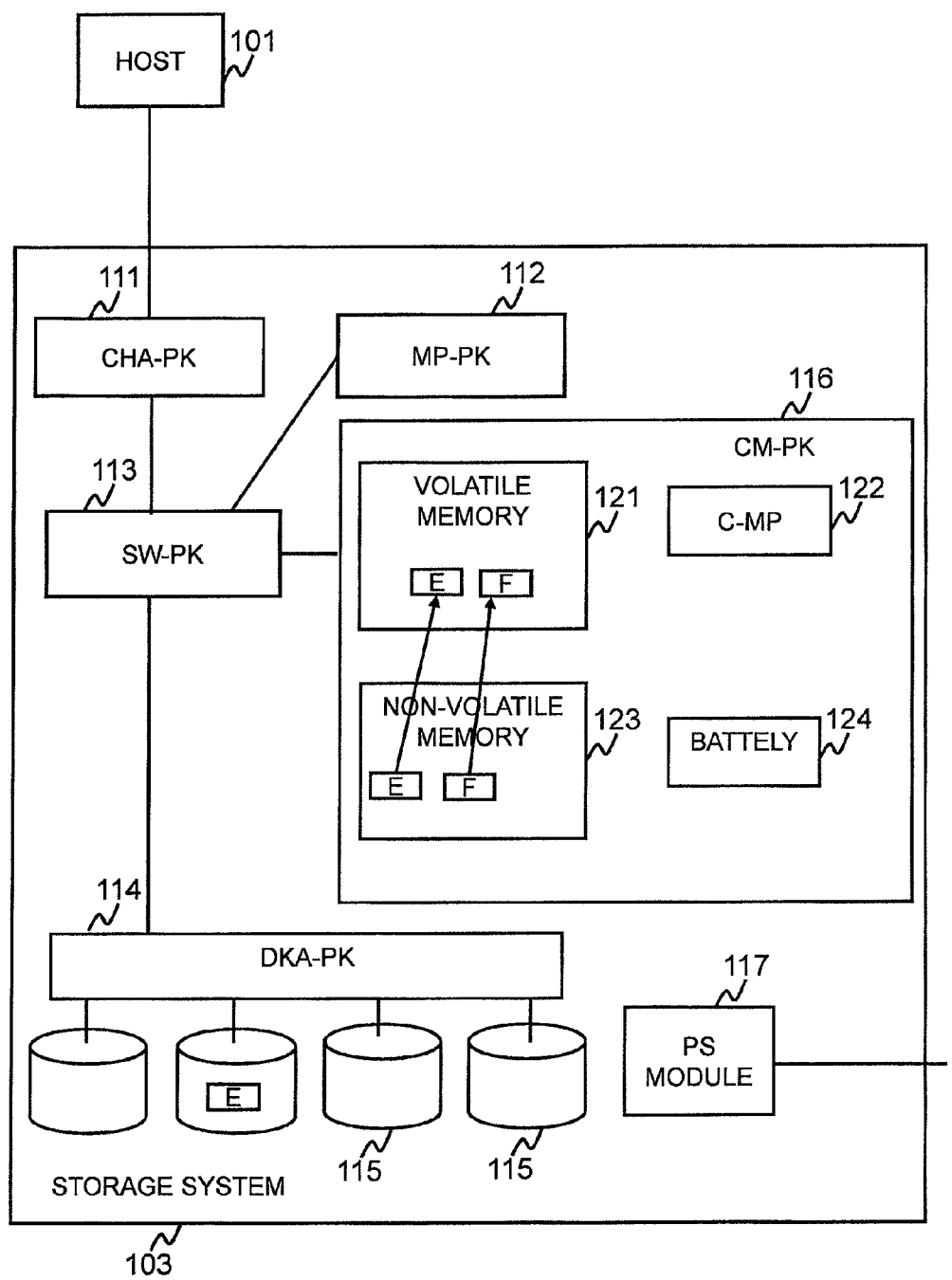
FIG. 22 shows an overview of recovery processing performed in a recovery phase.

In the recovery phase, as shown in FIG. 22, all information elements stored in the non-volatile memory 123, for example, the dirty data "E" and the control information element "F", are recovered from the non-volatile memory 123 to the volatile memory 121.

Figure 23:
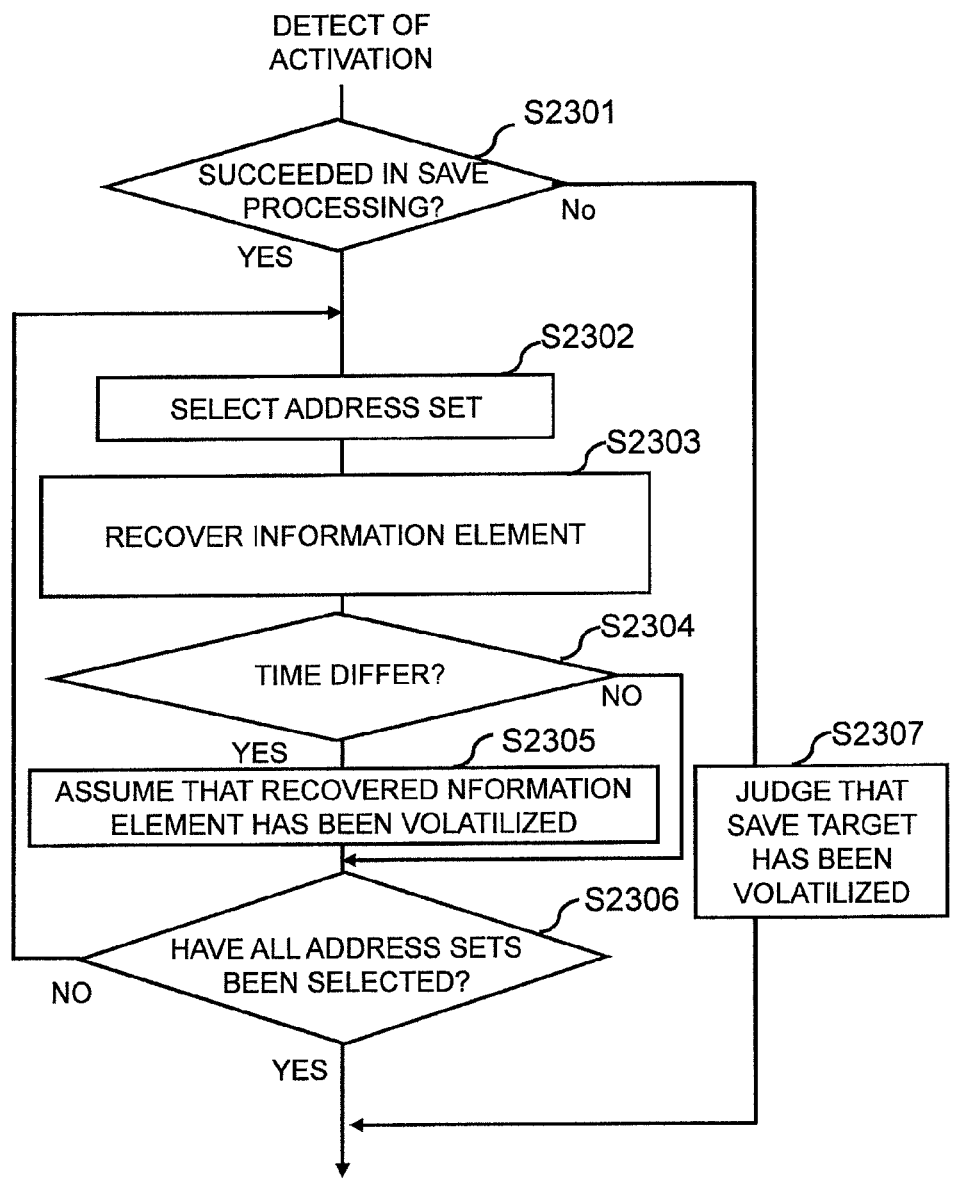
FIG. 23 shows a flow of the recovery processing performed in the recovery phase.

FIG. 23 shows a flow of recovery processing performed in the recovery phase.

When the recovery PG 3716 detects the activation of the storage system 103, the recovery PG 3716 instructs the C-MP 122 to perform recovery processing.

When information indicating save failure is stored in the non-volatile memory 123 (S2301: NO), the C-MP 122 judges that the save target has been volatilized (S2307). Specifically, the C-MP 122 notifies that the save target has been volatilized, to the recovery PG 3716. After the storage system 103 is activated, it is judged that the save target has been volatilized, and various types of control are performed.

When information indicating save success is stored in the non-volatile memory 123 (S2301: YES), the C-MP 122 selects one address set from the saved address management information 1710 (S2302), and recovers the information element from the area (the area in the non-volatile memory 123) corresponding to the address set (S2303). When the saving time information corresponding to the information element (for example, the saving time information corresponding to the control table) differs from the representative saving-time information 1501 (S2304: YES), the C-MP 122 assumes that the information element recovered in Step S2303 has been volatilized (S2305). When the saving time information corresponding to the recovered information element matches the representative saving-time information 1501 (S2304: NO), the C-MP 122 skips Step S2305. When an address set that has not been selected is included in the saved address management information 1710 (S2306: NO), the C-MP 122 performs Step S2302 for the address set. When an address set that has not been selected is not included in the saved address management information 1710 (S2306: YES), the C-MP 122 ends the recovery processing.

Whether it is assumed that the recovered information element has been volatilized is judged depending on whether the representative saving-time information matches the saving time information. Note that another type of information such as a count value may be used instead of the time information. For example, in FIG. 19, a representative saving value is updated to have a particular value in Step S1901, a saving value is updated to have the same value as the representative saving value in Step S1905, and the saving value is updated to have a value different from the representative saving value in Step S1906. By using this method, it is also possible, in the recovery processing, to judge whether it is assumed that the recovered information element has been volatilized depending on whether the representative saving value matches the saving value.

<Normal Phase>

In the normal phase, the following six types of processing (N-1) to (N-6) are performed, for example:

(N-1) battery monitoring processing;
(N-2) save-target control processing according to the battery charging rate;
(N-3) read processing/write processing (dirty-amount adjustment processing);
(N-4) control-table save processing;
(N-5) update management processing; and
(N-6) prior refresh processing.

(N-1) Battery Motoring Processing

The battery motoring processing is performed to regularly (or irregularly) check the charging rate of the battery 124. As described above, the battery motoring processing is performed through hardware processing or software processing.

The hardware processing is performed by the C-MP 122. The C-MP 122 sets information indicating the checked battery charging rate in the register. The battery charging rate information set in the register of the C-MP 122 is read and stored in the volatile memory 121 as the monitored charging-rate information 1301 (see FIG. 13) by the battery monitoring PG 3712.

The software processing is performed by the battery monitoring PG 3712. Specifically, the battery monitoring PG 3712 performs the following processes (26-A) to (26-C), for example.

(26-A) A time length (hereinafter, referred to as time length T) required to charge the battery 124 full from the current charging rate of the battery 124 is calculated based on a known charge characteristic of the battery 124, and the charging rate of the battery 124 is calculated (estimated) based on the time length T and the time elapsed since the storage system 103 was activated.

(26-B) When an interruption of power is detected, the remaining amount (charging rate) of the battery 124 is calculated based on the charging rate (the value calculated through the process (26-A)) of the battery 124 at the detection of the power interruption and based on the amount of battery consumption for each interruption of power, which is defined based on a known consumption characteristic of the battery 124 (or is calculated based on the charging rate of the battery 124 at the detection of the power interruption, the amount of battery consumption per unit time, and the time elapsed since the detection of the power interruption).

(26-C) The process (26-A) is performed when the recovery from the interruption of power is detected.

Figure 26:
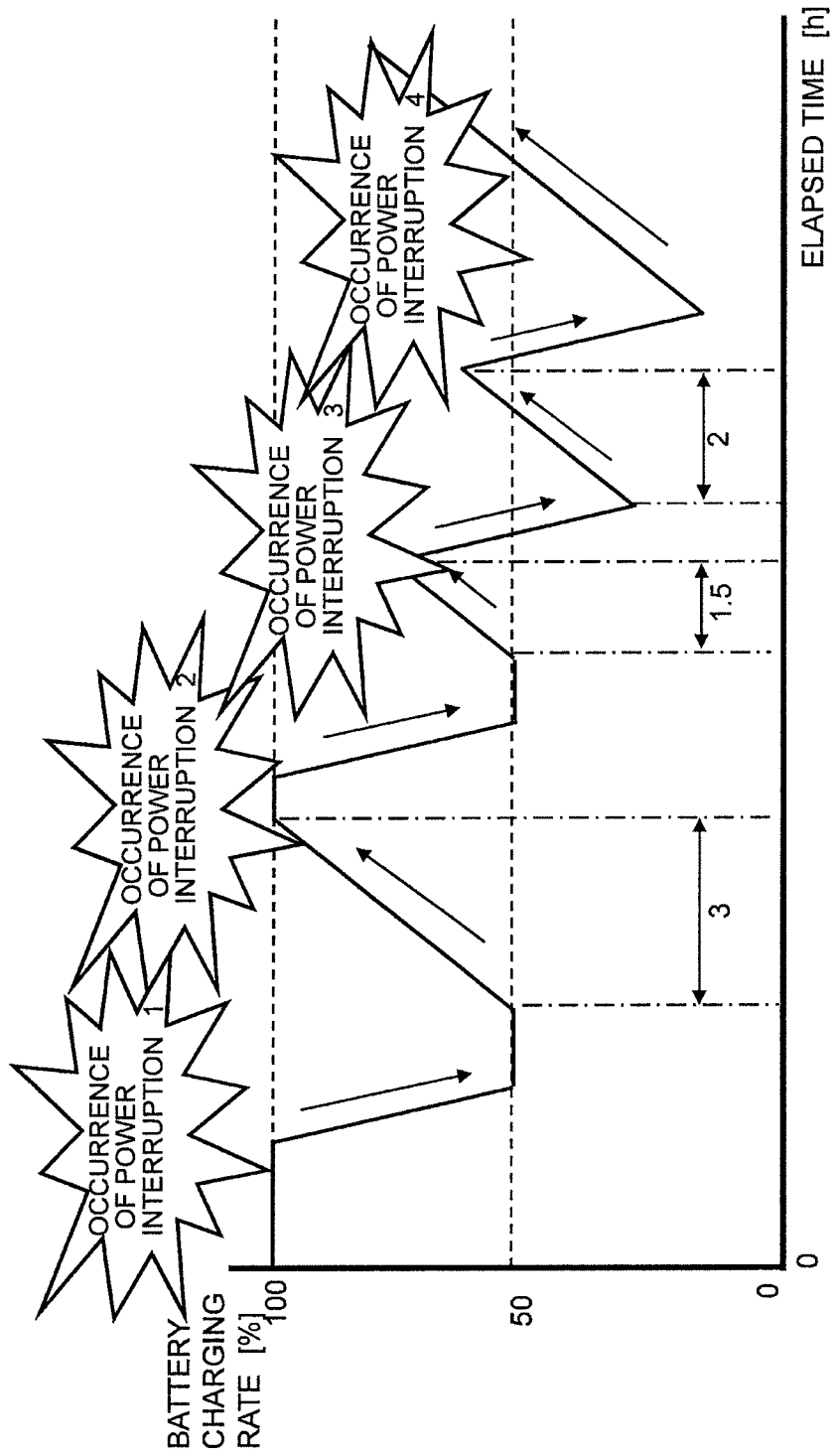
FIG. 26 is an explanatory diagram showing a specific example of battery motoring processing performed by software.

Hereinafter, a specific example of the battery motoring processing performed by software will be described with reference to FIG. 26. The battery monitoring PG 3712 performs the following processes (26-1) to (26-7) when it is assumed that the amount of battery consumption for each interruption of power is 50%.

(26-1) When the battery charging rate is 100%, a power interruption 1 occurs. The process (26-B) is then performed to find through the calculation that the battery charging rate (remaining amount) is 50%.

(26-2) When the battery charging rate is 50%, the storage system 103 is activated and the process (26-A) is performed. Since the time (3 hours) required for obtaining the charging rate of 100% from the charging rate of 50% has elapsed since the activation, it is found through the calculation that the battery charging rate is 100%.

(26-3) When the battery charging rate is 100%, a power interruption 2 occurs. The process (26-B) is then performed to find through the calculation that the battery charging rate (remaining amount) is 50%.

(26-4) When the battery charging rate is 50%, the storage system 103 is activated and the process (26-A) is performed. Since a power interruption 3 occurs when 1.5 hours, which is half the time (3 hours) required for obtaining the charging rate of 100% from the charging rate of 50%, have elapsed since the activation, it is found through the calculation that the battery charging rate at this time is 75% because 50%+25%=75%.

(26-5) The power interruption 3 occurs when the battery charging rate is 75%. The process (26-B) is then performed to find through the calculation that the battery charging rate (remaining amount) is 25%.

(26-6) When the battery charging rate is 25%, the storage system 103 is activated and the process (26-A) is performed. Since a power interruption 4 occurs when 2 hours have elapsed since the activation, it is found through the calculation that the battery charging rate at this time is 58% because (25%+(50%×2/3)) nearly equals to 58%.

(26-7) The power interruption 4 occurs when the battery charging rate is 58%. The process (26-B) is then performed to find through the calculation that the battery charging rate (remaining amount) is 8%.

As described above, since the battery motoring processing is performed by software, the battery charging rate can be checked even if the battery motoring processing performed by hardware is not supported or even if a failure occurs in the C-MP 122.

(N-2) Save-target Control Processing According to the Battery Charging Rate

Figure 35:
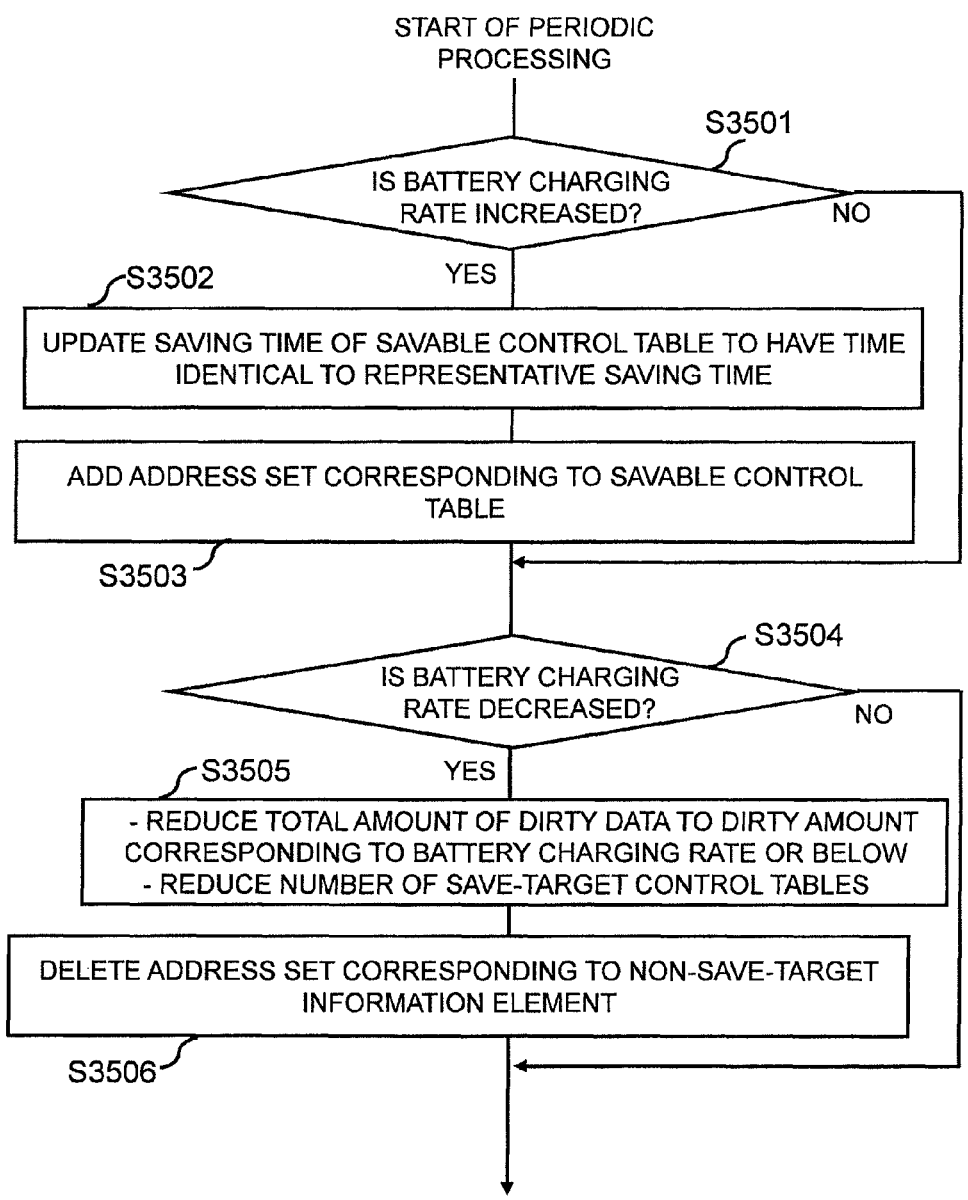
FIG. 35 shows a flow of the save-target control processing according to a battery charging rate.

In the save-target control processing according to the battery charging rate, a save target is controlled according to the checked battery charging rate. Every time the battery charging rate is checked, the save target control PG 3717 performs the save-target control processing according to the battery charging rate, shown in FIG. 35.

Specifically, the save target control PG 3717 performs a charging-rate comparing process to compare the checked battery charging rate (the battery charging rate indicated by the latest monitored charging-rate information 1301) with the battery charging rate checked at the preceding time.

As a result of the charging-rate comparing process, when the checked battery charging rate falls in the same battery charging rate range as the battery charging rate checked at the preceding time (S3501: NO, S3504: NO), processes of Steps S3502, S3503, S3505, and S3506 are not performed.

As a result of the charging-rate comparing process, when the checked battery charging rate is lower than the battery charging rate checked at the preceding time, specifically, when the battery charging rate range in which the checked battery charging rate falls is lower than the battery charging rate range in which the battery charging rate checked at the preceding time falls (S3501: NO, S3054: YES), the save target control PG 3717 performs the following processes in Step S3505.

(3505-1) When the total amount of dirty data in the volatile memory 121 exceeds the dirty amount (prescribed dirty amount) corresponding to the battery charging rate range in which the checked battery charging rate falls, dirty data is stored in any of the HDDs 115 (in other words, the total amount of dirty data is reduced) such that the total amount of dirty data becomes equal to or lower than the prescribed dirty amount. Further, the monitored dirty-amount information 1401 (see FIG. 14) is accordingly updated.

(3505-2) When the total amount of control information elements to be saved exceeds the control information amount (hereinafter, referred to as prescribed information amount) corresponding to the battery charging rate range in which the checked battery charging rate falls, more control tables (specifically, more control tables for each of which "necessary" is recorded as the saving necessity information and "low" is recorded as the saving importance-level information) are made non-save targets such that the total amount of the control information elements to be saved becomes equal to or lower than the prescribed information amount, and information indicating the current time is set in the table management information 1001 (see FIG. 10) as the saving time information corresponding to each of the non-save-target control tables.

Therefore, in the recovery processing to be performed later, it can be judged that recovered control tables are identical to control tables which were not saved when the power interruption occurred because the time indicated by the recovered representative saving-time information 1501 does not match the saving time corresponding to each of the non-save-target control tables.

Then, in Step S3506, the save target control PG 3717 deletes from the address management information 1710 (see FIG. 17) the following address sets (3506-1) and (3506-2).

(3506-1) The address set indicating the address range of the area (area in the volatile memory 121) where the dirty data that was stored in any of the HDDs 115 in the process (3505-1) had been stored.

(3506-2) The address sets indicating the address ranges of the areas (areas in the volatile memory 121) where the control tables that were made non-save targets in the process (3505-2) are stored.

Figure 36:
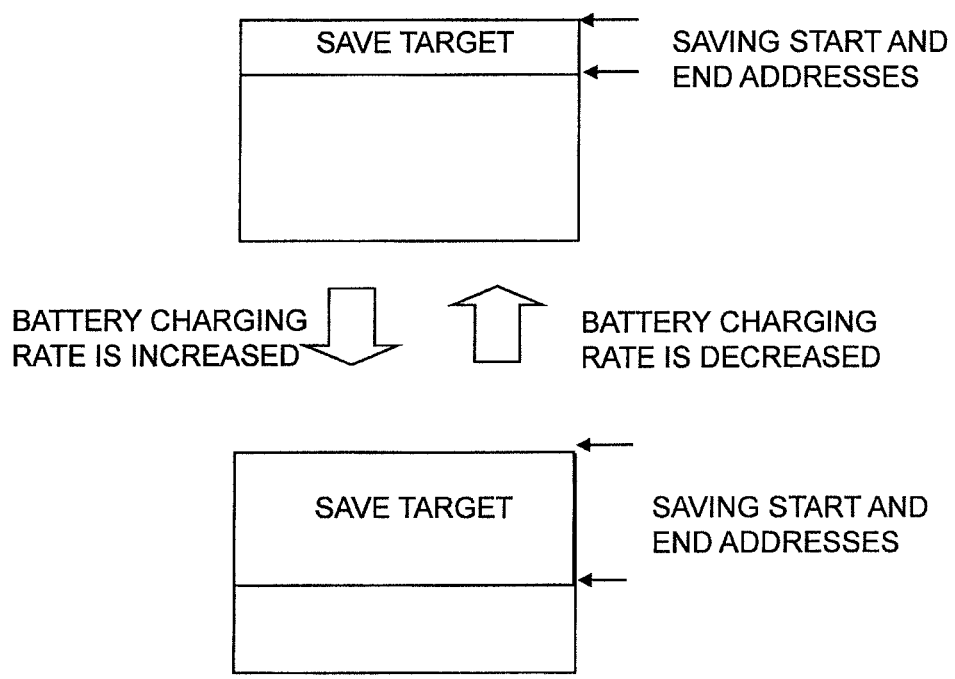
FIG. 36 shows that the save-target total amount is adjusted through the save-target control processing according to a battery charging rate.

As a result, the total amount of control information elements to be saved when a power interruption occurs is reduced as shown in FIG. 36.

As a result of the charging-rate comparing process, when the checked battery charging rate is higher than the battery charging rate checked at the preceding time, specifically, when the battery charging rate range in which the checked battery charging rate falls is higher than the battery charging rate range in which the battery charging rate checked at the preceding time falls (S3501: YES), the save target control PG 3717 performs the following process in Step S3502. Specifically, the save target control PG 3717 makes more control tables (specifically, more control tables for each of which "necessary" is recorded as the saving necessity information and "low" is recorded as the saving importance-level information) save targets as long as the total amount of the control information elements to be saved does not exceed the control information amount (prescribed information amount) corresponding to the battery charging rate range in which the checked battery charging rate falls. Further, the save target control PG 3717 sets information indicating the representative saving-time information in the table management information 1001 (see FIG. 10) as the saving time information corresponding to each of the save-target control tables. Accordingly, in the recovery processing to be performed later, it can be judged that the recovered control tables are identical to control tables which were saved when the power interruption occurred because the time indicated by the recovered representative saving-time information 1501 matches the saving time corresponding to each of the save-target control information tables.

Then, in Step S3503, the save target control PG 3717 adds the address sets indicating the address ranges of the areas (areas in the volatile memory 121) where the control tables that were made save targets in Step S3502 are stored, to the address management information 1710 (see FIG. 17). As a result, the total amount of control information elements to be saved when a power interruption occurs is increased as shown in FIG. 36.

In the save-target control processing according to the battery charging rate, the total amount of save-target dirty data and the total amount of save-target control information elements can be identified from the address sets specified in the address management information 1710. Therefore, for example, in Step S3505, it is possible to determine whether the total amount of save-target control information elements is made equal to or lower than the prescribed information amount by changing which control table for which "low" is recorded as the saving importance-level information from a save target to a non-save target.

Figure 24:
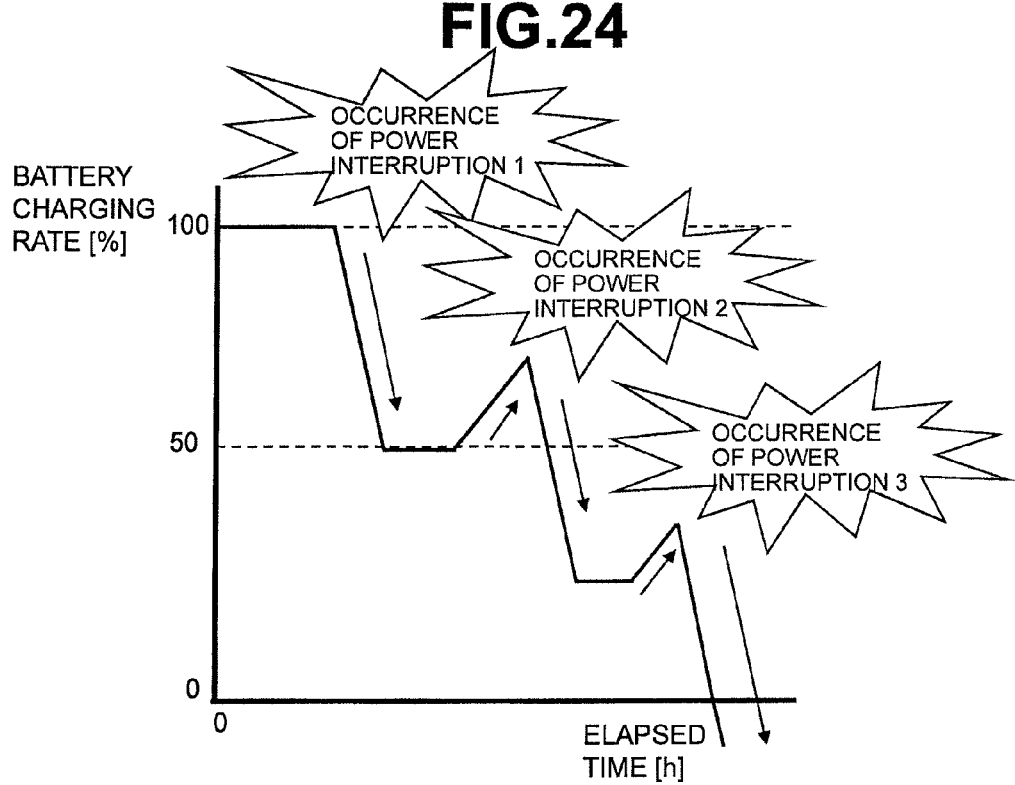
FIG. 24 shows a problem caused when save-target control processing according to a battery charging rate is not performed.
Figure 25:
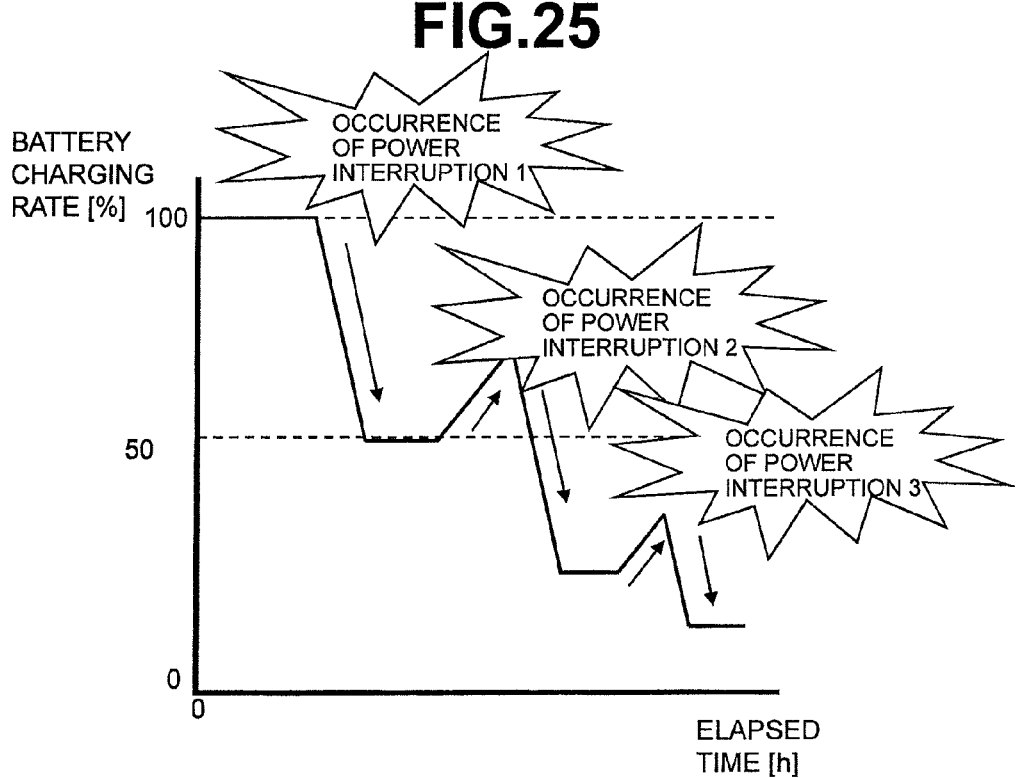
FIG. 25 shows an example effect obtained when the save-target control processing according to a battery charging rate is performed.

According to the save-target control processing according to the battery charging rate, the total amount of save targets is controlled based on the battery charging rate. Therefore, the remaining battery charge amount can be prevented from being exhausted, for example, by frequent power interruptions as shown in FIG. 24. Specifically, as shown in FIG. 25, for example, when the battery charging rate is low, the save-target total amount is controlled so as to be low, thereby requiring a short time for save processing. As a result, the battery charging rate to be consumed for each interruption of power is reduced. Therefore, unlike the example shown in FIG. 24, the remaining battery charge amount can be prevented from being exhausted as shown in FIG. 25.

(N-3) Read Processing/write Processing (Dirty-amount Adjustment Processing)

The read processing and the write processing have been described above with reference to FIG. 5 and FIG. 6, respectively.

In the write processing, the amount of dirty data in the volatile memory 121 is temporarily increased. Therefore, the I/O control PG 3711 performs dirty-amount adjustment processing shown in FIG. 28.

Figure 28:
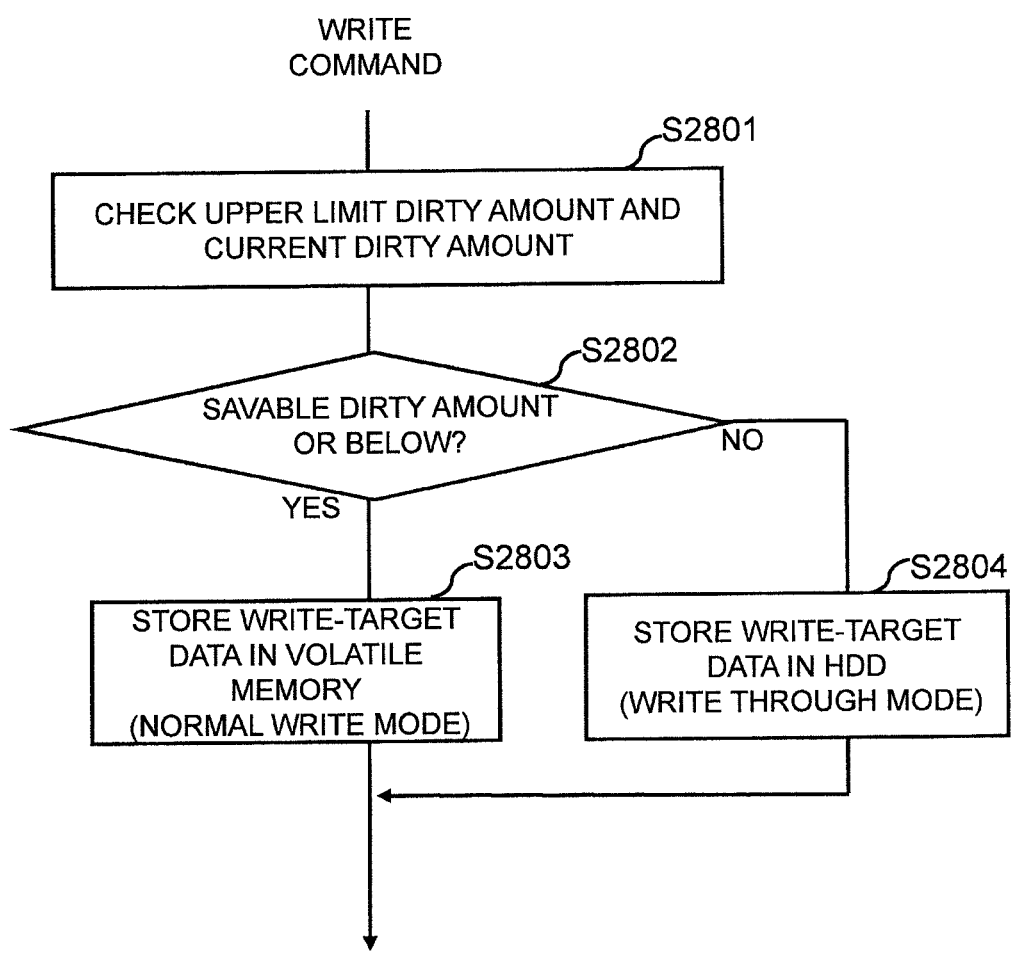
FIG. 28 shows a flow of the dirty-amount adjustment processing.

When a write command is received, the I/O control PG 3711 checks the dirty amount corresponding to the charging rate indicated by the monitored charging-rate information 1301 (hereinafter, referred to as "upper limit dirty amount" in the description given with reference to FIG. 28) from the dirty-amount management information 1101, and checks the dirty amount indicated by the monitored dirty-amount information 1401 (hereinafter, referred to as "current dirty amount" in the description given with reference to FIG. 28) (S2801).

Figure 27:
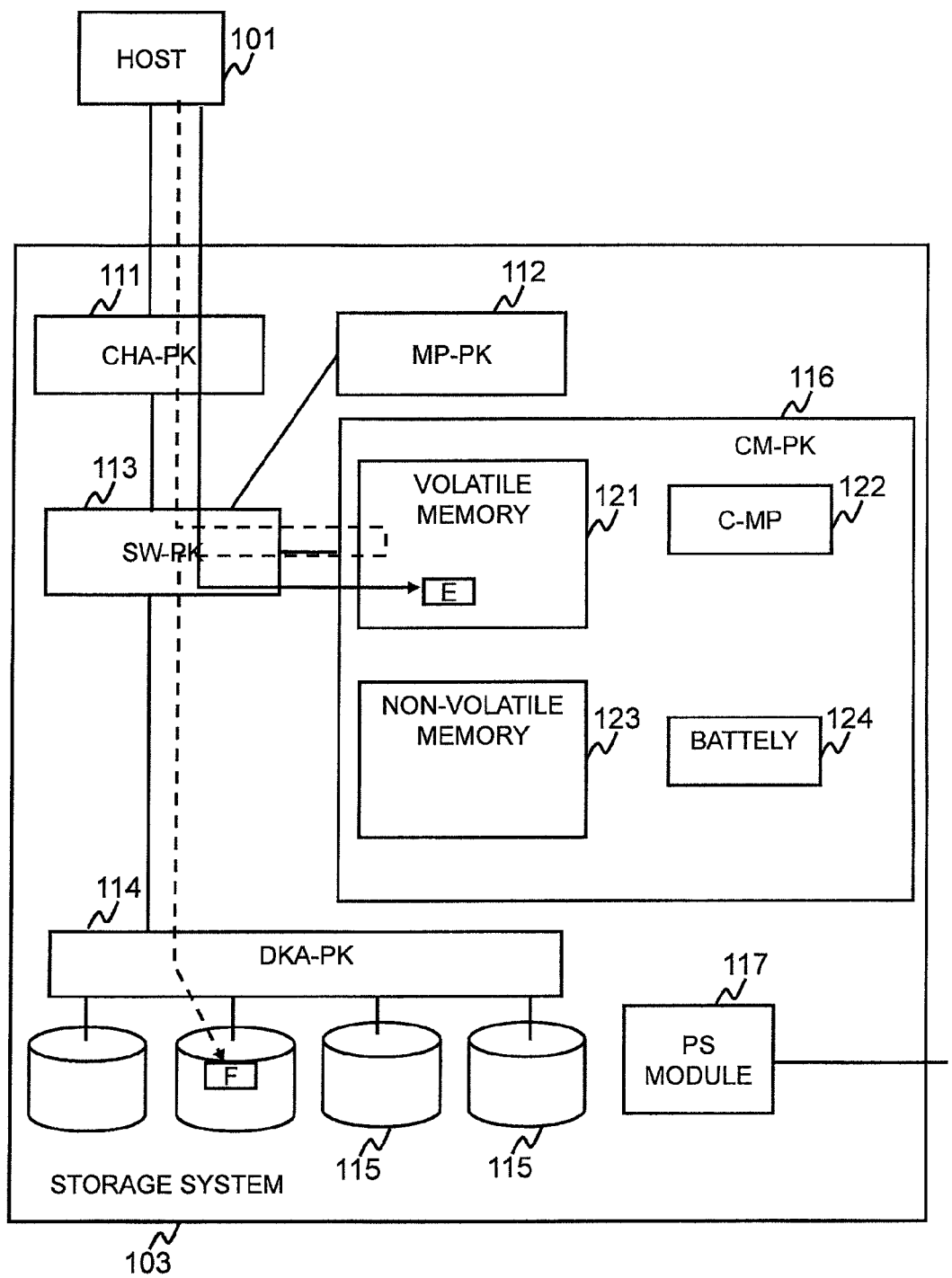
FIG. 27 shows an overview of dirty-amount adjustment processing.

When the sum of the information amount of the write-target data and the current dirty amount does not exceed the upper limit dirty amount (S2802: YES), the I/O control PG 3711 performs a process according to a normal write mode as indicated by the solid arrow shown in FIG. 27. Specifically, the I/O control PG 3711 writes the write-target data to the volatile memory 121 (S2803), and returns a response indicating the write completion to the host 101. In this case, the I/O control PG 3711 sets "dirty" in the host data management information 1701 as the slot state corresponding to the slot where the write-target data is stored.

On the other hand, when the sum of the information amount of the write-target data and the current dirty amount exceeds the upper limit dirty amount (S2802: NO), the I/O control PG 3711 performs a process according to a write through mode as indicated by the dotted line arrow shown in FIG. 27. Specifically, the I/O control PG 3711 temporarily stores the write-target data in the volatile memory 121, stores the write-target data in the corresponding HDD 115 (S2804), and returns a response indicating the write completion to the host 101. In this case, the I/O control PG 3711 sets "clean" in the host data management information 1701 as the slot state corresponding to the slot where the write-target data is stored.

Through the dirty-amount adjustment processing, the total amount of dirty data in the volatile memory 121 can be prevented from exceeding the amount of dirty data which can be saved in the power interruption phase.

(N-4) Control-table Save Processing

Figure 30:
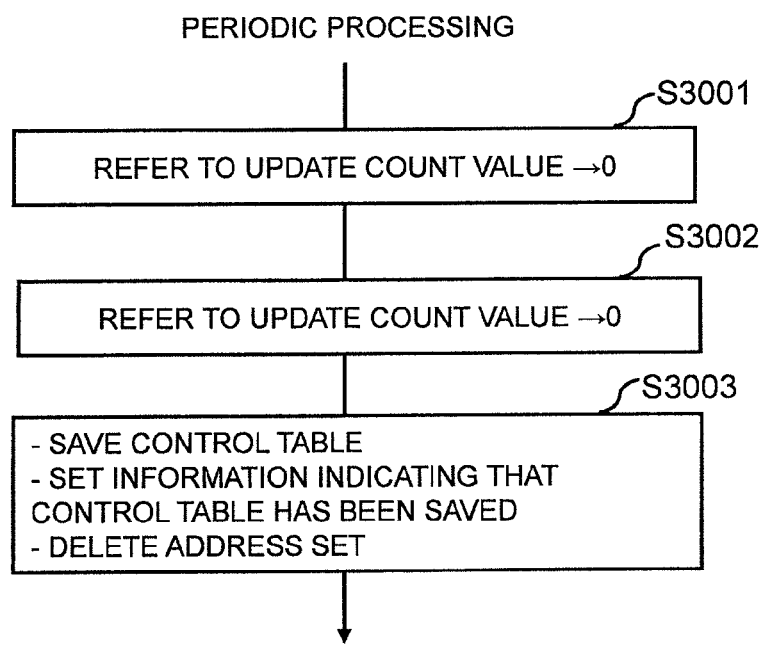
FIG. 30 shows a flow of the control-table save processing.

As shown in FIG. 30, the save target control PG 3717 regularly checks the update count value corresponding to each control table (S3001, S3002).

The save target control PG 3717 stores a control table whose update count value is not changed even after the update count value is checked a predetermined number of times, in the non-volatile memory 123, updates the saving completion information corresponding to the control table to have "0", which indicates that the control table has been saved, and deletes the address set corresponding to the control table from the address management information 1710 (S3003).

Figure 29:
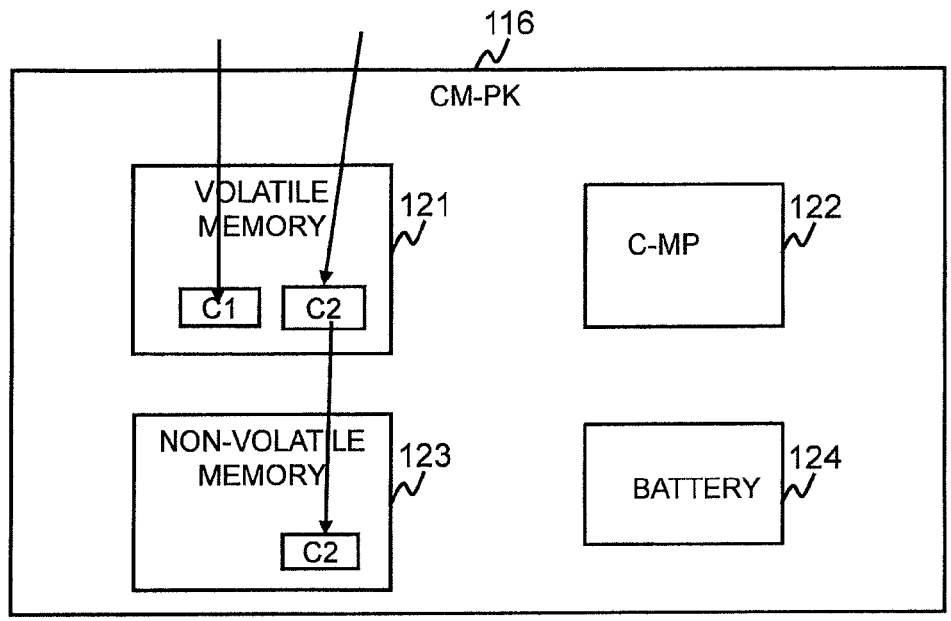
FIG. 29 shows an overview of control-table save processing.

According to the control-table save processing, for example, as shown in FIG. 29, a control table "C1" which has been updated within a predetermined period of time, that is, a control table "C1" which is frequently updated, is not saved to the non-volatile memory 123, whereas a control table which has not been updated within the predetermined period of time, that is, a control table "C2" which is less updated, is stored in advance in the non-volatile memory 123 before the save processing is performed in the scheduled down time phase or in the power interruption phase, and is made a non-save target (the address set corresponding to the area where the control table "C2" is stored is deleted from the address management information 1710). As a result, the time required for the save processing performed in the scheduled down time phase and in the power interruption phase can be reduced.

(N-5) Update Management Processing

Figure 32:
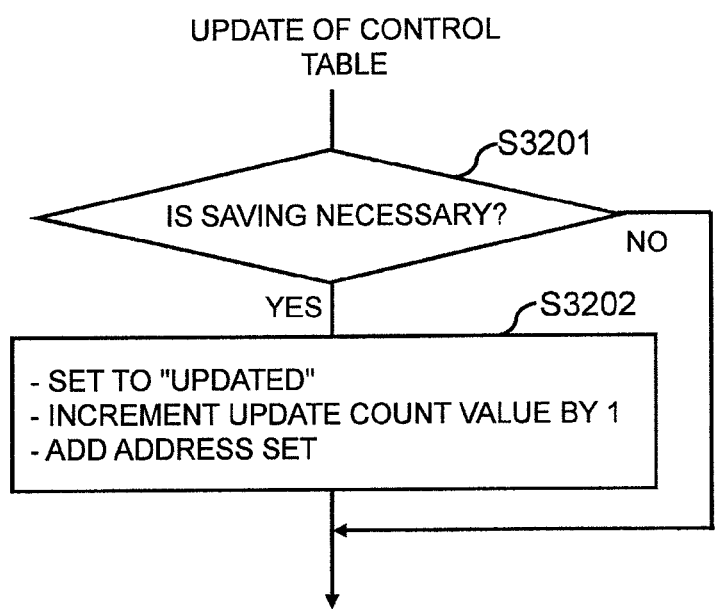
FIG. 32 shows a flow of the update management processing.

When a particular event occurs (for example, when data is migrated from a logical volume to another logical volume, or when the state of a pair of volumes is changed), at least one control table may be updated. In this case, as shown in FIG. 32, when the updated control table (hereinafter, referred to as "target control table" in the description given with reference to FIG. 32) is a control table for which "necessary" is recorded as the saving necessity information (S3201: YES), the control information management PG 3714 performs the following processes (3202-1) to (3202-4) in Step S3202.

(3202-1) The updated-or-not information (updated-or-not information in the table management information 1001) corresponding to the target control table is set to "updated".

(3202-2) The update count value corresponding to the target control table is incremented by 1.

(3202-3) The saving completion information corresponding to the target control table is updated to have "1", which indicates that the target control table has not been saved.

(3202-4) The address set corresponding to the area where the target control table is stored is added to the address management information 1710.

Figure 31:
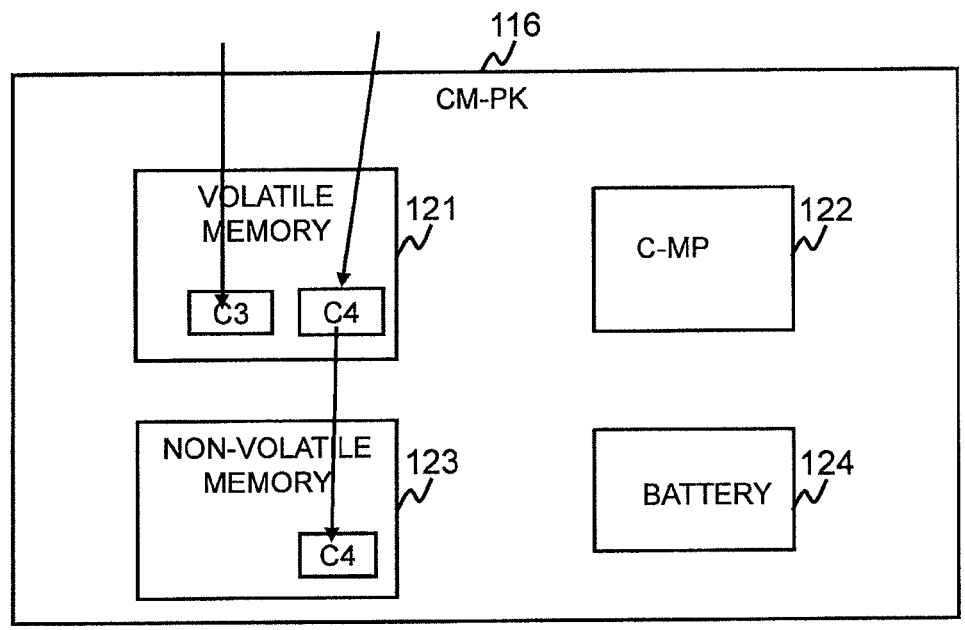
FIG. 31 shows an overview of update management processing.

According to the update management processing, among a plurality of control tables, only a control table which has been updated after the storage system 103 was activated is made a save target. Specifically, for example, after the storage system 103 is activated, the address management information 1710 includes only the address set corresponding to a predetermined save target. Therefore, as shown in FIG. 31, for example, when the storage system 103 enters the scheduled down time phase or the power interruption phase while a control table "C3" is not updated, the control table "C3" is a non-save target in the scheduled down time phase or the power interruption phase. On the other hand, a control table "C4" which has been updated is a save target in the scheduled down time phase or in the power interruption phase.

(N-6) Prior Refresh Processing

Figure 34:
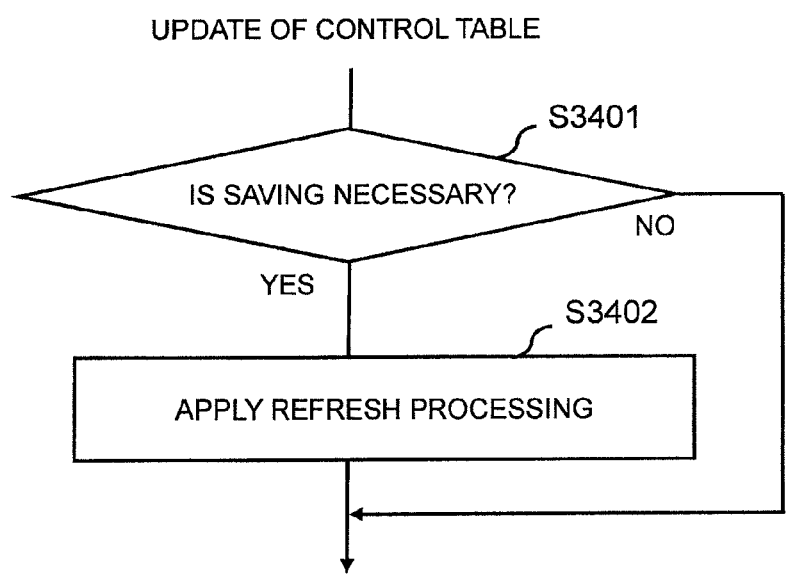
FIG. 34 shows a flow of prior refresh processing.

As described above, when a particular event occurs, at least one control table may be updated. In this case, as shown in FIG. 34, when the updated control table (hereinafter, referred to as "target control table" in the description given with reference to FIG. 34) is a control table for which "necessary" is recorded as the saving necessity information (S3401: YES), the refresh PG 3715 applies refresh processing, specifically, deletion processing, to the area in the non-volatile memory (flash memory) 123, corresponding to the area where the control table is stored. For example, when a NAND flash memory, which includes a plurality of physical blocks each having a plurality of physical pages, is used, write processing or read processing is applied to each physical page, whereas the refresh processing (deletion processing) is applied to each physical block.

Through the prior refresh processing, it can be expected that the time required for the save processing is reduced. A specific description will be given below.

Specifically, to overwrite information in an area of the flash memory, the refresh processing needs to be once applied to the area. However, applying the refresh processing at the time of save processing increases the time required for the save processing.

Figure 33:
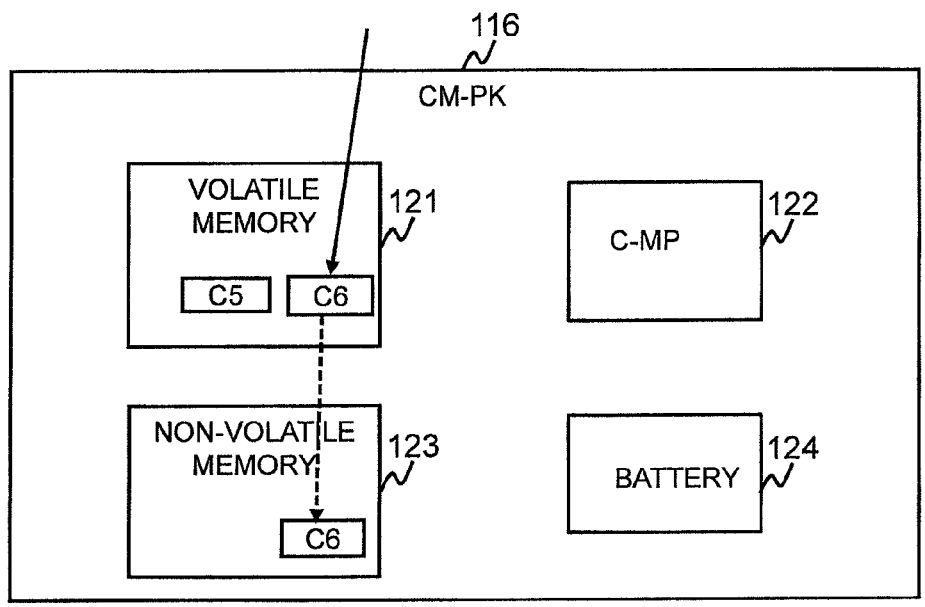
FIG. 33 shows that a control table which has been updated is overwritten to a non-volatile memory.

As shown in FIG. 33, one of save targets is a control table "C6" which has been updated.

In this embodiment, before save processing is performed, the refresh processing is applied in advance to the area, in the non-volatile memory 123, corresponding to the updated control table "C6". Therefore, the refresh processing does not need to be applied when the updated control table is saved, so that it can be expected to reduce the time required for the save processing.

Note that the prior refresh processing may be applied, in addition to the area corresponding to an updated control table, to the save-destination area of a control information element which is to be saved even if it has not been updated.

Figure 38:
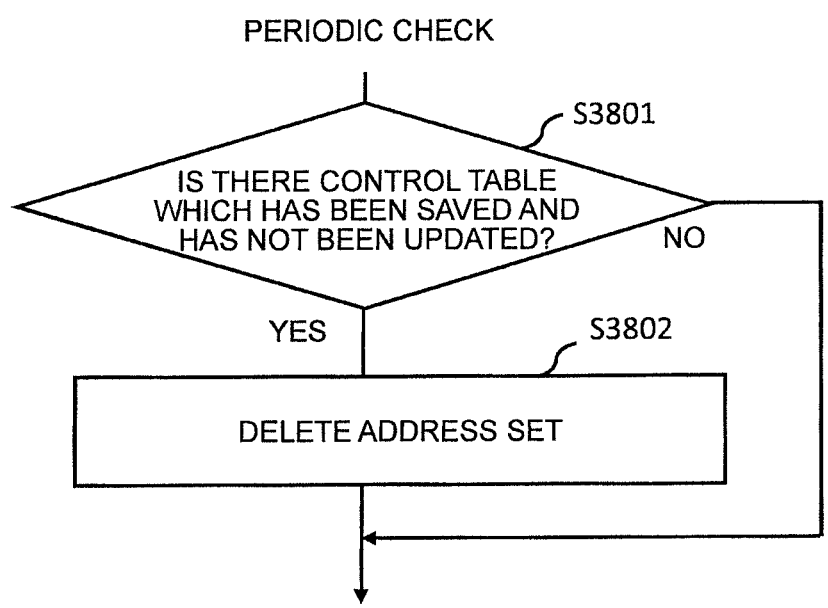
FIG. 38 shows a flow of processing of making a control table which has been saved and has not been updated, a non-save target.

Although the preferred embodiment of the present invention has been described above, the present invention is not limited to this embodiment and various modifications can be made without departing from the scope of the invention. For example, instead of an address set, a set of a start address (or an end address) and a data size may be employed. Further, for example, as shown in FIG. 38, the save target control PG 3717 may regularly check the table management information 1001 (S3801), and delete the address set corresponding to the area where a control table which has been saved but has not been updated is stored, from the address management information 1710 (S3802). In other words, the control table which has been saved but has not been updated may be made a non-save target in advance prior to the scheduled down time phase and the power interruption phase.

What is claimed is:

1. A storage system comprising:
   a plurality of storage devices;
   a volatile memory which temporarily stores data;
   a nonvolatile memory;
   a battery saving power; and
   a cache control unit which sets, according to battery charging rate of the battery, a part of the data stored in the volatile memory as save target data which are to be saved to the nonvolatile memory when power interruption occurs, and saves the part of the data, which is set as the save target data, to the nonvolatile memory by using power of the battery when power interruption occurs;
   wherein when the micro processor receives write command from the host computer:
   the micro processor determines whether sum of the amount of data corresponding to the write command and an amount of dirty data exceeds a first threshold which is determined by the battery charging rate;
   the microprocessor temporality stores the data corresponding to the write command in the volatile memory as the dirty data if the sum of the amount of data corresponding to the write command and the amount of dirty data does not exceed the first threshold; and
   the microprocessor stores the data corresponding to the write command in the volatile memory as clean data, and writes the data corresponding to the write command to the plurality of storage devices if the sum of the amount of data corresponding to the write command and the amount of dirty data exceeds the first threshold.

2. A storage system according to claim 1:
   wherein the data stored in the volatile memory includes first data corresponding to I/O commands sent from a host computer and second data corresponding to control information.

3. A storage system according to claim 2:
   wherein an amount of dirty data, which is included in the first data, set as the save target data, is lower than a first threshold which is determined by the battery charging rate; and
   wherein the amount of the second data set as the save target data is lower than a second threshold which is determined by the battery charging rate.

4. A storage system according to claim 1:
   wherein the cache control unit periodically checks the charging rate of the battery; and
   wherein the cache control unit changes data, which is set as the save target data, according to the checked charging rate of the battery.

5. A storage system method effected by a storage system including:
   a plurality of storage devices;
   a volatile memory which temporarily stores data;
   a nonvolatile memory;
   a battery saving power; and
   a cache control unit;
   where the storage system method comprises:

setting, according to battery charging rate of the battery, a part of the data stored in the volatile memory as save target data which are to be saved to the nonvolatile memory when power interruption occurs, and saving the part of the data, which is set as the save target data, to the nonvolatile memory by using power of the battery when power interruption occurs;

the storage system method further comprising:

wherein when the micro processor receives write command from the host computer, the micro processor:

determines whether sum of the amount of data corresponding to the write command and an amount of dirty data exceeds a first threshold which is determined by the battery charging rate;

temporality stores the data corresponding to the write command in the volatile memory as the dirty data if the sum of the amount of data corresponding to the write command and the amount of dirty data does not exceed the first threshold; and stores the data corresponding to the write command in the volatile memory as clean data, and writes the data corresponding to the write command to the plurality of storage devices if the sum of the amount of data corresponding to the write command and the amount of dirty data exceeds the first threshold.

6. A storage system method according to claim 5:

wherein the data stored in the volatile memory includes first data corresponding to I/O commands sent from a host computer and second data corresponding to control information.

7. A storage system method according to claim 6:

wherein an amount of dirty data, which is included in the first data, set as the save target data, is lower than a first threshold which is determined by the battery charging rate; and wherein the amount of the second data set as the save target data is lower than a second threshold which is determined by the battery charging rate.

8. A storage system method according to claim 5, further comprising:

the cache control unit:

periodically checking the charging rate of the battery; and changes data, which is set as the save target data, according to the checked charging rate of the battery.

* * * * *